(12) United States Patent
Zuev et al.

(10) Patent No.: US 9,645,993 B2
(45) Date of Patent: May 9, 2017

(54) METHOD AND SYSTEM FOR SEMANTIC SEARCHING

(71) Applicant: ABBYY InfoPoisk LLC, Moscow (RU)

(72) Inventors: Konstantin Zuev, Moscow (RU); Tatiana Danielyan, Moscow (RU); Elmira Rakhmatulina, Moscow (RU)

(73) Assignee: ABBYY InfoPoisk LLC (RU)

( * ) Notice: Subject to any disclaimer, the term of this patent is extended or adjusted under 35 U.S.C. 154(b) by 325 days.

(21) Appl. No.: 14/142,701

(22) Filed: Dec. 27, 2013

(65) Prior Publication Data

US 2014/0114649 A1 Apr. 24, 2014

Related U.S. Application Data

(63) Continuation-in-part of application No. 13/173,649, filed on Jun. 30, 2011, now Pat. No. 9,069,750, and a continuation-in-part of application No. 13/173,369, filed on Jun. 30, 2011, now Pat. No. 9,098,489, which is a continuation-in-part of application No. 12/983,220, filed on Dec. 31, 2010, now Pat. No. 9,075,864, which is a continuation of application No. 11/548,214, filed on Oct. 10, 2006, now Pat. No. 8,078,450.

(51) Int. Cl.
*G06F 17/27* (2006.01)
*G06F 17/30* (2006.01)
*G06F 17/28* (2006.01)

(52) U.S. Cl.
CPC .......... *G06F 17/27* (2013.01); *G06F 17/2785* (2013.01); *G06F 17/289* (2013.01); *G06F 17/30011* (2013.01); *G06F 17/30684* (2013.01)

(58) Field of Classification Search
USPC .......................................................... 704/9
See application file for complete search history.

(56) References Cited

U.S. PATENT DOCUMENTS 4,706,212 A 11/1987 Toma
5,068,789 A 11/1991 Van Vliembergen
(Continued)

FOREIGN PATENT DOCUMENTS

WO 2011160204 A1 12/2011

OTHER PUBLICATIONS

Bolshakov, "Co-Ordinative Ellipsis in Russian Texts: Problems of Description and Restoration", Published in: Proceedings COLING '88 Proceedings of the 12th conference on Computational linguistics—vol. 1 doi>10.3115/991635.991649, 1988, 65-67.

(Continued)

*Primary Examiner* — Shaun Roberts
(74) *Attorney, Agent, or Firm* — Veronica Weinstein

(57) ABSTRACT

A method and system for facilitating a semantic search based on one or more corpuses of natural language texts are provided. One or more corpuses of natural language texts are received including indexed linguistic parameters and semantic structures of lexical units. The linguistic parameters and semantic structures are generated during a preliminary syntactico-semantic analysis. Searching for text fragments satisfying a query in the one or more corpuses is performed. Relevance of the search results is estimated.

30 Claims, 25 Drawing Sheets

(56) References Cited

U.S. PATENT DOCUMENTS

| | | |
|---|---|---|
| 5,128,865 A | 7/1992 | Sadler |
| 5,146,405 A | 9/1992 | Church |
| 5,175,684 A | 12/1992 | Chong |
| 5,268,839 A | 12/1993 | Kaji |
| 5,301,109 A | 4/1994 | Landauer et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibil |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,677,835 A | 10/1997 | Carbonell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,873,056 A | 2/1999 | Liddy et al. |
| 5,884,247 A | 3/1999 | Christy |
| 6,006,221 A | 12/1999 | Liddy et al. |
| 6,023,697 A * | 2/2000 | Bates ............... G06F 9/4446 |
| 6,055,528 A | 4/2000 | Evans |
| 6,076,051 A | 6/2000 | Messerly et al. |
| 6,081,774 A | 6/2000 | De Hita et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,243,669 B1 | 6/2001 | Horiguchi |
| 6,243,670 B1 | 6/2001 | Bessho et al. |
| 6,243,689 B1 | 6/2001 | Norton |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,442,524 B1 | 8/2002 | Ecker et al. |
| 6,463,404 B1 | 10/2002 | Appleby |
| 6,470,306 B1 | 10/2002 | Pringle et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,675,159 B1 * | 1/2004 | Lin ............... G06F 17/2705 |
| 6,721,697 B1 | 4/2004 | Duan et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 * | 5/2005 | Corston ............ G06F 17/30684 |
| 6,901,402 B1 | 5/2005 | Corston-Oliver et al. |
| 6,928,448 B1 | 8/2005 | Franz et al. |
| 6,937,974 B1 | 8/2005 | D'Agostini |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,146,358 B1 | 12/2006 | Gravano et al. |
| 7,167,824 B2 | 1/2007 | Kallulli |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,346,493 B2 | 3/2008 | Ringger et al. |
| 7,356,457 B2 | 4/2008 | Pinkham et al. |
| 7,475,015 B2 | 1/2009 | Epstein et al. |
| 7,493,253 B1 * | 2/2009 | Ceusters ............ G06F 17/2775 704/10 |
| 7,672,831 B2 | 3/2010 | Todhunter et al. |
| 7,739,102 B2 | 6/2010 | Bender |
| 8,078,450 B2 | 12/2011 | Anisimovich et al. |
| 8,145,473 B2 | 3/2012 | Anisimovich et al. |
| 8,214,199 B2 | 7/2012 | Anismovich et al. |
| 8,229,730 B2 | 7/2012 | Van Den Berg et al. |
| 8,285,728 B1 | 10/2012 | Rubin |
| 8,301,633 B2 | 10/2012 | Cheslow |
| 2001/0014902 A1 | 8/2001 | Hu et al. |
| 2001/0029455 A1 | 10/2001 | Chin et al. |
| 2001/0037328 A1 * | 11/2001 | Pustejovsky .......... G06F 17/271 |
| 2002/0040292 A1 | 4/2002 | Marcu |
| 2003/0158723 A1 | 8/2003 | Masuichi et al. |
| 2003/0176999 A1 | 9/2003 | Calcagno et al. |
| 2003/0182102 A1 | 9/2003 | Corston-Oliver et al. |
| 2003/0204392 A1 | 10/2003 | Finnigan et al. |
| 2004/0098247 A1 | 5/2004 | Moore |
| 2004/0122656 A1 | 6/2004 | Abir |
| 2004/0172235 A1 | 9/2004 | Pinkham et al. |
| 2004/0193401 A1 | 9/2004 | Ringger et al. |
| 2004/0254781 A1 | 12/2004 | Appleby |
| 2005/0010421 A1 | 1/2005 | Watanabe et al. |
| 2005/0015240 A1 | 1/2005 | Appleby |
| 2005/0080613 A1 * | 4/2005 | Colledge ............. G06F 17/2785 704/9 |
| 2005/0086047 A1 | 4/2005 | Uchimoto et al. |
| 2005/0137853 A1 | 6/2005 | Appleby et al. |
| 2005/0155017 A1 | 7/2005 | Berstis et al. |
| 2005/0171757 A1 | 8/2005 | Appleby |
| 2005/0209844 A1 | 9/2005 | Wu et al. |
| 2005/0240392 A1 | 10/2005 | Munro, Jr. et al. |
| 2006/0004563 A1 | 1/2006 | Campbell et al. |
| 2006/0004653 A1 | 1/2006 | Strongin |
| 2006/0080079 A1 | 4/2006 | Yamabana |
| 2006/0095250 A1 | 5/2006 | Chen et al. |
| 2006/0217964 A1 | 9/2006 | Kamatani et al. |
| 2006/0224378 A1 | 10/2006 | Chino et al. |
| 2006/0293876 A1 | 12/2006 | Kamatani et al. |
| 2007/0010990 A1 | 1/2007 | Woo |
| 2007/0016398 A1 | 1/2007 | Buchholz |
| 2007/0083359 A1 | 4/2007 | Bender |
| 2007/0083505 A1 | 4/2007 | Ferrari et al. |
| 2007/0100601 A1 | 5/2007 | Kimura |
| 2008/0319947 A1 | 12/2008 | Latzina et al. |
| 2009/0063472 A1 | 3/2009 | Pell et al. |
| 2011/0055188 A1 | 3/2011 | Gras |
| 2011/0072021 A1 | 3/2011 | Lu et al. |

OTHER PUBLICATIONS

Hutchins, "Machine Translation: Past, Present, Future", (Ellis Horwood Series in Computers and their Applications) Ellis Horwood:Chichester, 1986, 382 pp. ISBN 0-85312-788-3.

(56) References Cited

OTHER PUBLICATIONS

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

\* cited by examiner

- PART_OF_CREATIVE_WORK
- PRODUCTION_AS_TIME_ART
- RESULTS_OF_MAKING_DECISIONS
  - DECISION_AS_RESULT
  - DIAGNOSIS
  - ISSUE_PRECLUSION
  - SENTENCE_PRONOUNCED_BY_COURT
    - приговор
      - CUSTODIAL_SENTENCE
      - DEATH_SENTENCE
      - JUDGEMENT_OF_ACQUITTAL
      - PRISON_SENTENCE
      - SENTENCE_OF_IMPRISONMENT
      - SUSPENDED_SENTENCE
      - VERDICT
  - SOLUTION_AS_RESULT
  - VOTE_AS_COLLECTIVE_OPINION
- RESULTS_OF_SPEECH_MENTAL_ACTIVITY
- MONEY
- MULTIMEDIA
- VIRTUAL_OBJECT
- VISUAL_REPRESENTATION
- MENTAL_OBJECT
- ORGANIZATION
- PART_OR_PORTION_OF_ENTITY
- PHYSICAL_OBJECT
- SUBSTANCE
- OBJECTS_BY_FORM_OF_MANIFESTATION
- SPACE_AND_SPATIAL_OBJECTS
- TIME
- ENTITY_OR_SITUATION_PRONOUN
- SITUATIONAL_AND_ATTRIBUTIVE_CLASSES

FIG. 5D

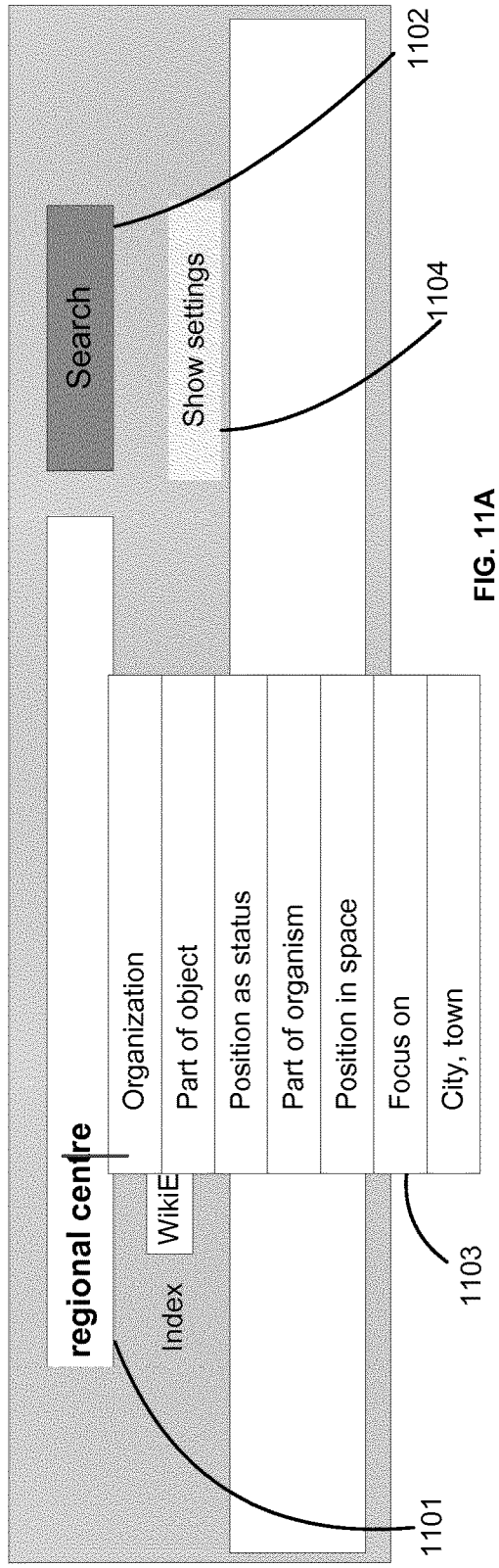
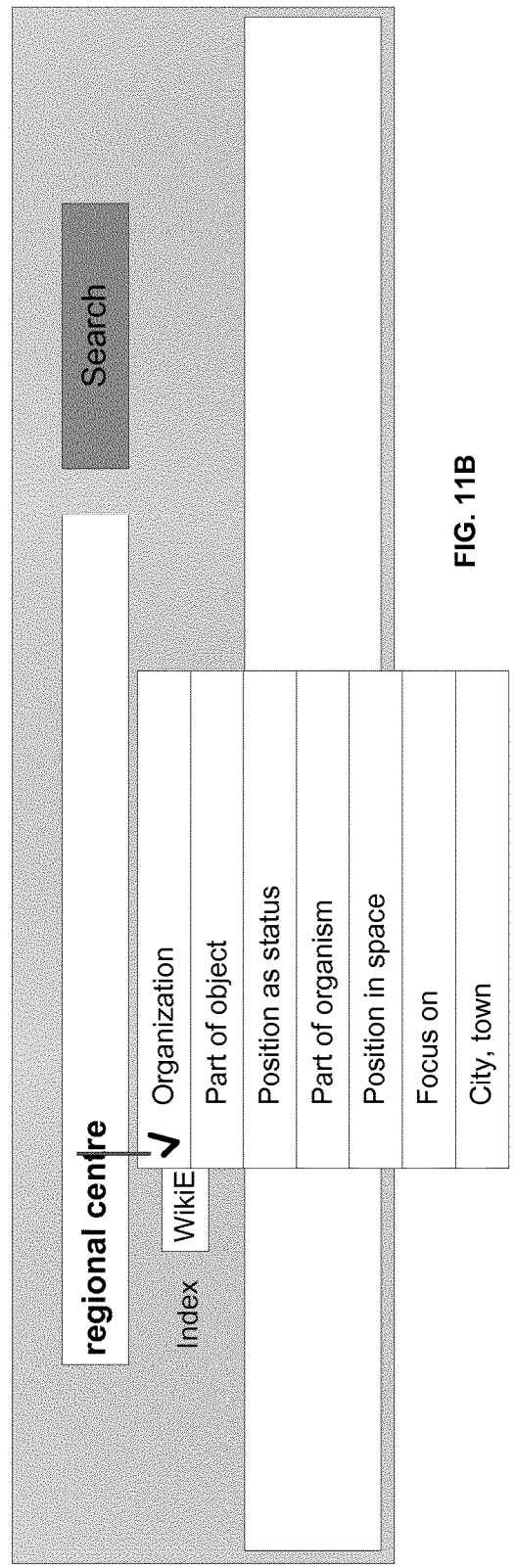
FIG. 11A
FIG. 11B regional centre

Index WikiEn

Search

Show settings

Performed query: [ Ch_Scale: regional ] centre

Text: centre
Semantic classes: centre:
CENTRE_AS_ORGANIZATION
Representative synonyms:
center:CENTRE_AS_ORGANIZATION,
organization:ORGANIZATION

Canadian university scientific resea
Prairie Regional Data Centre
en.wikipedia.org/.../Canadian university sci

Regional centre (Singapore)
Regional centre (Singapore)
en.wikipedia.org/.../Regional centre (Singapore) saved copy

List of hospitals in Canada
Central Newfoundland Regional Health Centre
en.wikipedia.org/.../List of hospitals in Canada saved copy

Regional Meteorological Centre, Chennai
Regional Meteorological Centre, Chennai
en.wikipedia.org/.../Regional Meteorological Centre, Chennai saved copy

Regional Cancer Centre
Regional Cancer Centre
en.wikipedia.org/.../Regional Cancer Centre saved copy

Acharya Harihar Regional Cancer Centre
Acharya Harihar Regional Cancer Centre
en.wikipedia.org/.../Acharya Harihar Regional Cancer Centre saved copy Next>>

FIG. 11C centre

Index WikiEn

Search

Show settings

Performed query: centre

Regional Meteorological Centre, Chennai
Regional Meteorol Text: centre (Organization)
en.wikipedia.org/... Semantic classes: centre: CENTRE_AS_ORGANIZATION
  Representative synonyms:
List of hospitals i
Central Newfound center:CENTRE_AS_ORGANIZATION,
en.wikipedia.org/... organization:ORGANIZATION

Centre Island
Centre Text: centre (Part of object)
en.wiki Semantic classes: centre:CENTRE
  Representative synonyms: center:CENTRE,
Region middle:CENTRAL_PART, heartland: CENTRAL_PART,
Region midpoint:CENTRAL_PART
en.wiki

Cardiovascular centre
Cardiovascular cer Text: centre (Part of organism)
en.wikipedia.org/... Semantic classes: centre:CENTRE_ANATOMICAL
  Representative synonyms:
Centre-to-centre center:CENTRE_ANATOMICAL
Centre-to-centre
en.wikipedia.org/.../Centre-to-centre distance saved copy Next>>

FIG. 11D install windows

Index  WikiEn

[Search]  [Show settings]

Performed query: install "install:TO_INSTALL_AS_TO_PLACE" [ Object: windows "window:WINDOW_OF_BUILDING" ]

Rose window
However, in the 19th and 20th centuries, with the revival of the Gothic style much stained glass installed in rose windows, both in new churches and as restoration in old churches, was dedicated to the Virgin Mary.
en.wikipedia.org/.../Rose window saved copy

Roof windows
This type of light tube design is often employed with buildings where the installation of a skylight or roof window is not practical.
en.wikipedia.org/.../Roof windows saved copy

Replacement window
A replacement window is a window that is installed in an existing window opening.
en.wikipedia.org/.../Replacement window saved copy

Cox & Barnard
The firm designed a glazed canopy at the entrance of the former Hove Town Hall (destroyed by fire in 1966), featuring the design of the Hove coat of arms; in 1946 they installed a window in the tower of the medieval parish church of Portslade, St Nicolas' Church; and in the late 20th century they designed stained glass windows for two synagogues in Hove and restored the windows in the 19th-century Middle Street Synagogue in Brighton.
en.wikipedia.org/.../Cox & Barnard saved copy

First Presbyterian Church (Philadelphia)
A number of repairs are visible including one which employs glass from the original transept windows when the Tiffany windows were installed in 1906.
en.wikipedia.org/.../First Presbyterian Church (Philadelphia) saved copy Next>>

FIG. 11E install windows

Search

Index  WikiEn  Show settings

Performed query: install "install:install:TO_INSTALL" [ Object: windows "Windows:WINDOWS"]

Windows 2000
Remote Installation Services (RIS) are a means to automatically install Windows 2000 Professional (and not Windows 2000 Server) to a local computer over a network from a central server.
en.wikipedia.org/.../Windows 2000 saved copy Windows 95
5-inch floppy diskettes that would install Windows 95 either as an upgrade to Windows 3.
en.wikipedia.org/.../Windows 95 saved copy Windows Vista
The advantages of using Anytime Upgrade are that your programs and data aren't erased, it just installs the extra features of the edition you're upgrading to, and the price is less to upgrade than to replace your installation of Windows with the edition you wish to upgrade to.
en.wikipedia.org/.../Windows Vista saved copy Windows 98
Installing Windows 98 on a HDD that small is usually useless, because it doesn't leave much room for programs, but can be accomplished by moving the DriveSpace 3 container file there.
en.wikipedia.org/.../Windows 98 saved copy Windows Update
Windows Update can be configured to install critical updates automatically so long as the computer is connected to the Internet, without the user needing to install them manually, or even be aware that an update is required.
en.wikipedia.org/.../Windows Update saved copy Next>>

FIG. 11F

What countries were discovered?

Index  Test_En

Search

Show settings

Performed query: discover [Object:"COUNTRY"]

Murphy, Warren. Judgement Day. Part 1
America was discovered almost five hundred years ago.
For Sinanju, Chiun discovered America. saved copy

Card, Orson Scott. Pastwatch: The Redemption of Christopher Columbus. Part 1
Cristoforo Colombo, as he was baptized in Genova—he would not discover America after all, if she could find a way to stop him.   saved copy

Dostoevsky, Fyodor. A Raw Youth. Part 1.1
For every one else this was only a stupid little auction, but for me it was the first plank in the ship in which a Columbus would set out to discover his America. saved copy

Galsworthy, John. Over The River. 1
Australia wasn't discovered under Elizabeth. saved copy

Preston, Child. Riptide. part 2
They're plant specimens he collected in Botany Bay, shortly after they discovered Australia. saved copy

Kremlin_Speeches_2007(Jul-Sep).txt
After the interview, I said to Mr Ivanov: Recently I feel that Russia has, one could say, "discovered" Japan. saved copy Next>>

FIG. 12A

What do the people think about?

Index  Test_En                    Search

Show settings

Performed query: [$Subject: [...[people]]] think

Natalie Maines
Born in Lubbock, Texas, Maines considers herself a rebel who "loved not thinking in the way I knew the majority of people thought.
As a teenager I always loved not thinking in the way I knew the majority of people thought. saved copy

Economy of Hungary
Bribery is common in the healthcare system in the form of gratitude payment—92% of all people think that some payment should be made to the head surgeon conducting a heart operation or an obstetrician for a child birth. saved copy

Moon landing conspiracy theories
Various polls have shown that 6% to 28% of the people surveyed do not think the Moon landing happened. saved copy

Berlin Wall
Ten percent of people surveyed thought Berlin residents built it themselves. saved copy

Black people
The loss of melanin in white people is now thought to have been caused by a mutation in just one letter out of 3.1 billion letters of DNA. saved copy

Mainlander (China)
Although the numbers of these people are thought of as small and insignificant by most Taiwanese, it has been pointed out that recent immigrants from Mainland China and their children actually make up a larger population in Taiwan than Taiwanese aborigines. saved copy

Paranormal
A 2001 National Science Foundation survey found that 9 percent of people polled thought astrology was very scientific, and 31 percent thought it was somewhat scientific. saved copy Next>>

METHOD AND SYSTEM FOR SEMANTIC SEARCHING

CROSS-REFERENCE TO RELATED APPLICATIONS

This application is a continuation-in-part of U.S. patent application Ser. No. 13/173,649 filed on Jun. 30, 2011, entitled "METHOD AND SYSTEM FOR SEMANTIC SEARCHING OF NATURAL LANGUAGE TEXTS" and U.S. patent application Ser. No. 13/173,369, filed on Jun. 30, 2011, entitled "METHOD AND SYSTEM FOR SEMANTIC SEARCHING", which are continuations-in-part of U.S. patent application Ser. No. 12/983,220, filed on Dec. 31, 2010, entitled "Method and System for Semantic Searching", which is a continuation of U.S. patent application Ser. No. 11/548,214, filed on Oct. 10, 2006, entitled "METHOD AND SYSTEM FOR ANALYZING VARIOUS LANGUAGES AND CONSTRUCTING LANGUAGE-INDEPENDENT SEMANTIC STRUCTURES", now U.S. Pat. No. 8,078,450, which is currently co-pending, or is an application of which a currently co-pending application is entitled to the benefit of the filing date, the disclosure of which is incorporated herein by reference. This application claims priority under 35 USC 119 to Russian patent application 2013132622, filed Jul. 15, 2013, the disclosure of which is incorporated herein by reference.

BACKGROUND

The present disclosure relates generally to search technology. More specifically, the present disclosure relates to searching of electronic content. For example, content on the Internet and in other electronic resources (e.g., text corpora ("corpuses"), dictionaries, glossaries, encyclopedias, etc.) may be searched by the users.

Search results may be generated based on keywords entered by a user as part of a search query. Existing search systems enable users to use simple query languages to find documents that either contain or do not contain the words or word combinations specified by the user. However, due to existence of homonyms and homographs in natural languages, a search result based on a keyword search may include a substantial amount of non-relevant or marginally relevant information. For example, if the user searches for texts with the word "page" in the sense of "a man or boy employed as the personal attendant to a queen", the user may receive a large number of non-relevant information in the search results, where "page" may refer to an Internet webpage, a page in a newspaper or magazine, a section of stored data, etc. This is likely to happen because those other meanings of the word "page" are substantially more frequent than the one referring to a man or boy.

SUMMARY

An exemplary embodiment relates to a method for generating search results. The method includes receiving one or more corpuses of natural language texts including indexed linguistic parameters and semantic structures of lexical units, the linguistic parameters and semantic structures generated during a preliminary syntactico-semantic analysis. The method further includes searching for text fragments satisfying a query in the one or more corpuses. The method further includes estimating relevance of search results. The method further includes ranking search results according to estimated relevance.

Another exemplary embodiment relates to a system comprising: one or more data processors; and one or more storage devices storing instructions that, when executed by the one or more data processors, cause the one or more data processors to perform operations. The operations comprising receiving one or more corpuses of natural language texts including indexed linguistic parameters and semantic structures of lexical units, the linguistic parameters and semantic structures generated during a preliminary syntactico-semantic analysis. The operations further comprising includes searching for text fragments satisfying a query in the one or more corpuses. The operations further comprising estimating relevance of search results. The operations further comprising ranking search results according to estimated relevance.

Yet another exemplary embodiment relates to computer readable storage medium having machine instructions stored therein, the instructions being executable by a processor to cause the processor to perform operations. The operations comprising receiving one or more corpuses of natural language texts including indexed linguistic parameters and semantic structures of lexical units, the linguistic parameters and semantic structures generated during a preliminary syntactico-semantic analysis. The operations further comprising includes searching for text fragments satisfying a query in the one or more corpuses. The operations further comprising estimating relevance of search results. The operations further comprising ranking search results according to estimated relevance.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIGS. 5A-5D each illustrate a fragment of a semantic hierarchy;

FIGS. 11A-B illustrate graphical user interfaces of a search system allowing users to specify lexical meanings for keywords in a query;

FIGS. 11C-F illustrate graphical user interfaces displaying search results of semantic queries;

FIG. 12A-C illustrate graphical user interfaces displaying search results of semantic queries that are formulated as questions a using natural language;

FIG. 13 illustrates a graphical user interface displaying search results of a semantic query having variables for denoting "lacunas" and lexical meaning in searched sentences;

DETAILED DESCRIPTION

Figure 1A:
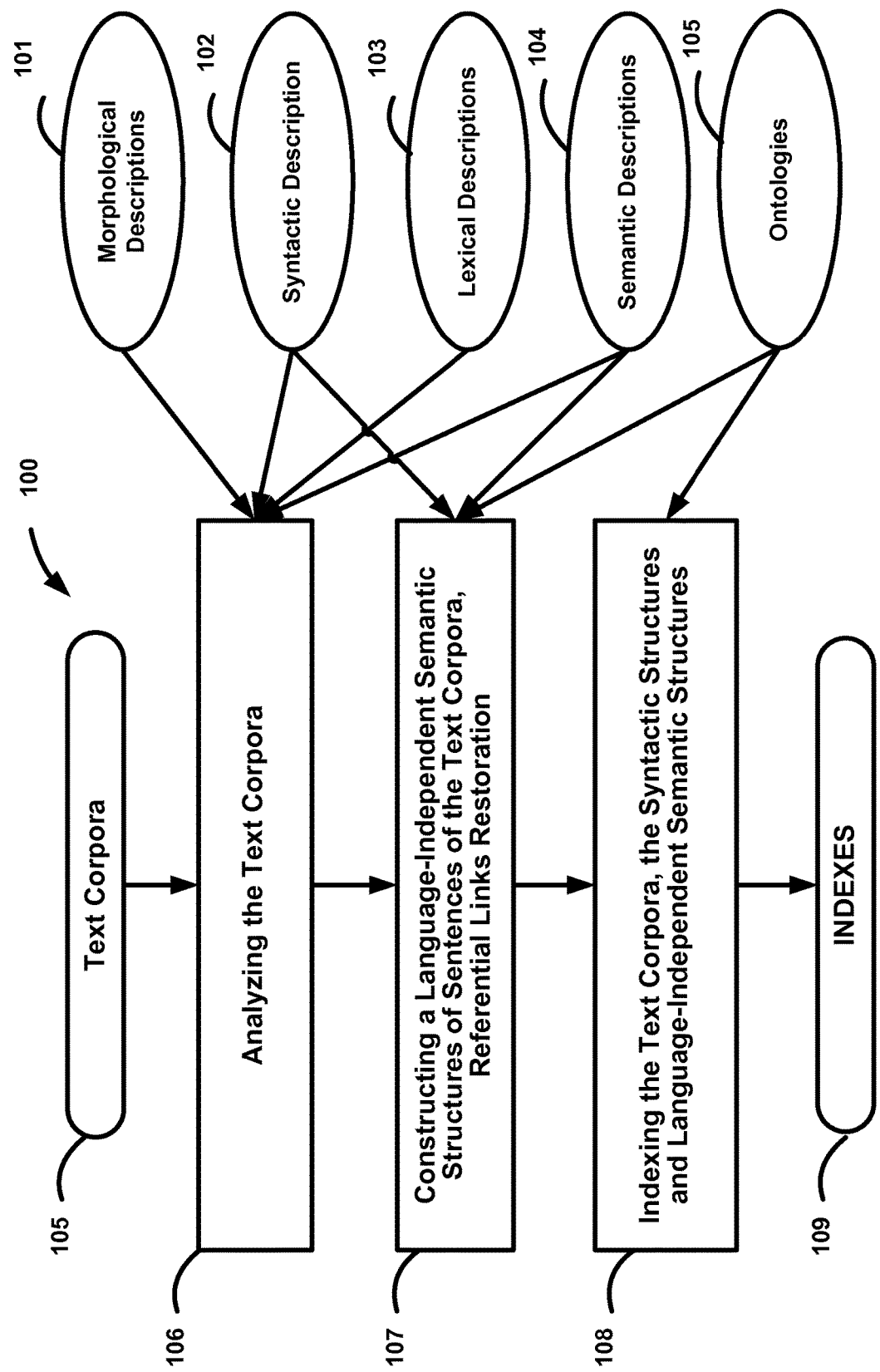
FIG. 1A illustrates a flow diagram of a process for preprocessing text corpora in a natural language prior to processing semantic searches.

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, a system performing semantic searches based on user specified queries is provided. While performing the semantic search, the system may take into account lexical meanings of one or more words in the query. A lexical meaning may be determined for one or more of the words in the search query. In some embodiments, a user interface provided by the system may allow a user to enter the query and select lexical meanings for one or more words in the selected query. For example, the user may right click using their mouse on a word that may have multiple meanings, and select a desired meaning from a shown list of meanings for that word. In other embodiments, the lexical meanings of the query words are determined by the system as disclosed herein. As a result, the search is performed not only using the words specified in the query, but also the words in specific lexical meanings.

Text corpora may be searched for the words specified by the user in a search query. The text corpora may include a set of texts, which may be electronically stored. Comprehensive semantic and syntactic parsing of text corpora is performed with the extraction of the full range of lexical, morphological, syntactic and semantic parameters of sentences and the construction of their semantic structures. A subsequent semantic indexing structure allows the user to search for not only "triplets" (i.e., three data entities {subject, predicate, object}) but sentences of any specified structure, including a query formulated in natural language (e.g., a natural language question). The user may indicate (e.g., by selecting parameters in settings provided in the user interface) whether two or more words included in the query can be contained in the same sentence. The query may be formulated to relate directly to a set of words that belong to a class or possess specific properties or characteristics. The system may enable the user to search for sentences with specified syntactic and/or semantic properties, such as illustrations of a given semantic relation (link). In particular, the system may allow the user to create queries based on grammatical meanings, semantic and/or semantic positions (links), syntactic patterns, stylistic and/or semantic features. The system may be useful to lexicographers, philologists, linguists, students and teachers of native and foreign languages, as well as to many conventional users.

The system may index natural language texts, and perform semantic searching using the indexed natural language texts as disclosed herein. The system may build at least one index for each text or text corpus by conducting a comprehensive or exhaustive syntactic and semantic analysis of natural language texts. During the syntactic and semantic analysis of the natural language texts, any combination of the following information is analyzed, saved, and/or indexed: numerous individual words, numerous lexical meanings of the words, the lexical, syntactic, and semantic information about each sentence received during the syntactic and semantic analysis. Lexical meanings of some or all words, all syntactic and semantic information about each sentence in the natural language texts generated pursuant to the syntactic and semantic analysis may be saved. The saved information may include data saved during interim steps of the analysis (interim parsing results), results of lexical parsing (lexical choices), including the results obtained when resolving ambiguities. The generated index may be used for semantic searching of natural language texts, as described herein.

The search systems described herein allow the user to search and locate relevant information using a semantic query that is formulated in a special language for semantic queries, and/or using natural language. The same analyzer or parser may be utilized to analyze the query in natural language, identify its syntactical structure and construct the semantic structure and, thus, for the system to determine the meaning of the query. The search is performed in accordance with the syntactic and semantic information stored in resources that permit these types of searches. Thus, the user can obtain relevant query results.

Moreover, since the search query can be formulated or translated into universal language-independent semantic terms, the search can be executed in text corpora containing documents in different languages. Thus, the user can obtain information presented in different resources independent of the language in which the search query was formulated. The search results can be presented to the user both in the language of the resource, in the original form as found in the document, and/or it can be translated into the language of the query using a machine translation system.

The United States U.S. Pat. No. 8,078,450 describes a method that includes deep syntactic and semantic analysis of natural language texts based on comprehensive linguistic descriptions. This method can be used at the analysis stage of the described method in building indices. The method uses a broad spectrum of linguistic descriptions, both universal semantic mechanisms and those associated with the specific language, which allows all the real complexities of the language to be reflected without simplification or artificial limits, without any danger of a combinatorial explosion, or an unguided growth in complexity. In addition, these analytical methods are based on principles of cohesive purpose-driven recognition, i.e., hypotheses about the structure of a portion of a sentence are verified as part of checking the hypotheses about the structure of the entire sentence. That makes it possible to avoid analyzing a large set of anomalies and variations.

Figure 2:
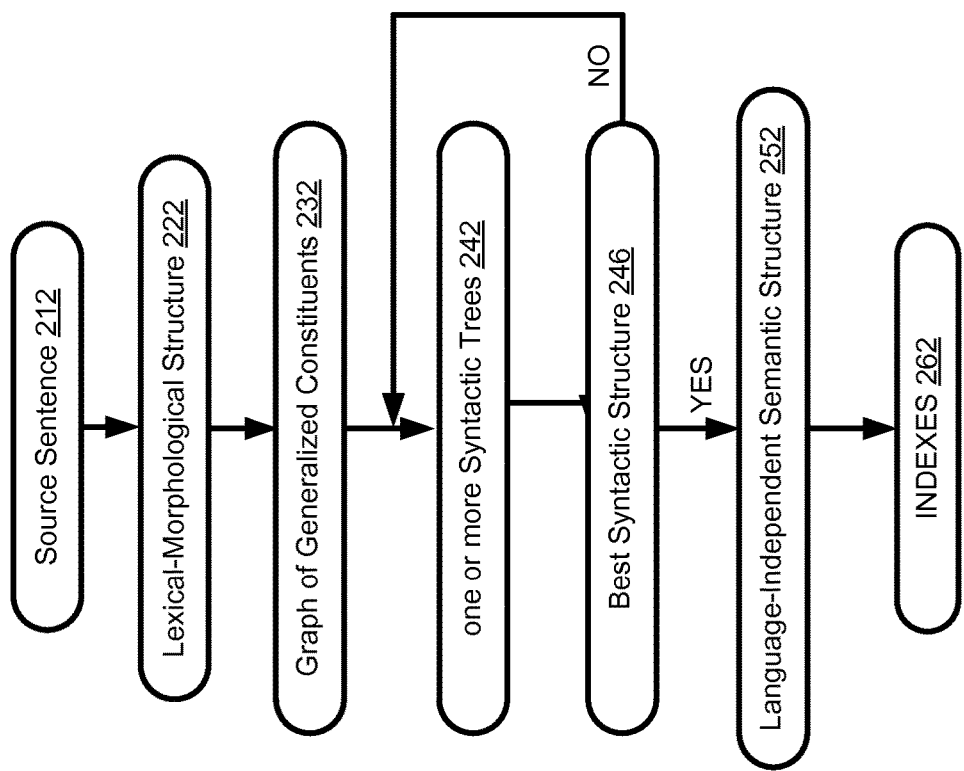
FIG. 2 illustrates a sequence of structures created during process of analysis of sentence.

The deep analysis may include lexical-morphological, syntactic and semantic analysis of each sentence of the text corpus, resulting in the construction of language-independent semantic structures in which each word of text is assigned to a corresponding semantic class. FIG. 1A illustrates a process (100) for performing the deep analysis of the text corpus and the construction of indices in accordance with one implementation. The text corpus (105) is subjected to exhaustive semantic-syntactic analysis (106) with the use of linguistic descriptions of the source language and of universal semantic descriptions, which makes it possible to analyze not only the surface syntactic structure but also the deep semantic structure that expresses the meaning of each sentence and the links between sentences or text blocks. Linguistic descriptions may include lexical descriptions (101), morphological descriptions (102), syntactic descriptions (103) and semantic descriptions (104). The analysis (106) includes a syntactic analysis done as a two-stage algorithm (rough syntactic analysis and precise syntactic analysis) using linguistic models and information at various levels to compute probabilities and generate the most likely ("best") syntactic structure. FIG. 2 illustrates the sequence of structures formed during the analysis of the sentence according to one embodiment.

Figure 1B:
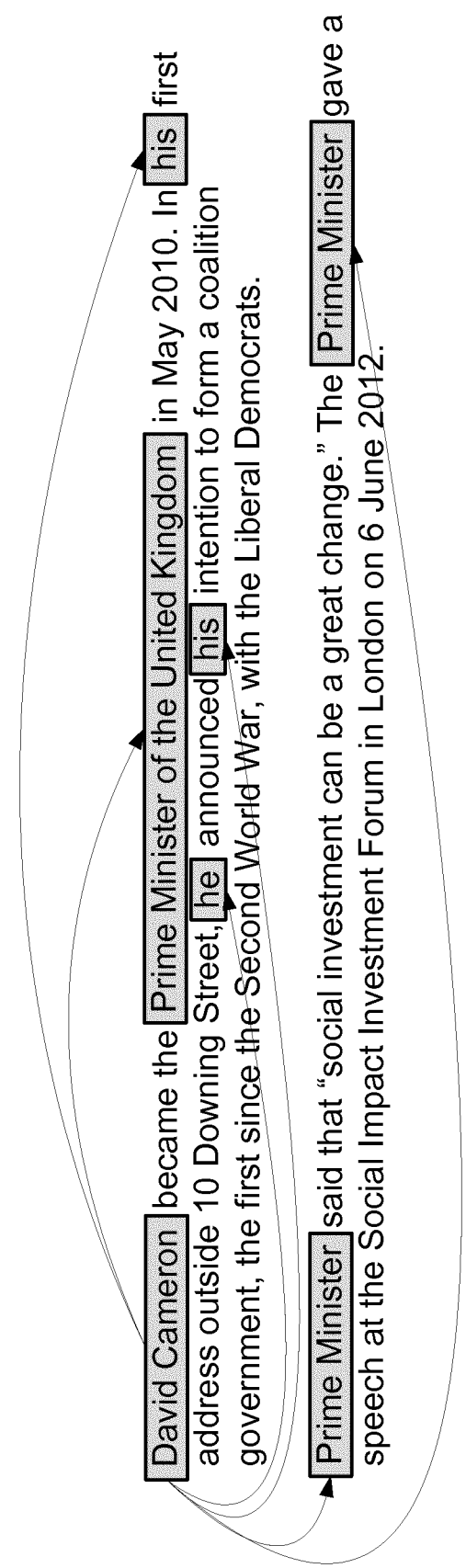
FIG. 1B illustrates a fragment of a text having referential links between sentences.

Next, a language-independent semantic structure (107) is built or generated, which constitutes the meaning of the given sentence. This stage may also include restoration of referential links between sentences. An example of a referential link is anaphora—the use of linguistic constructions that can be interpreted only if another text block, usually the previous one, is taken into account. FIG. 1B illustrates a text block with referential links between sentences. These links on the level of corresponding semantic structures are established at stage 107. In particular, for subsequent indexing, personal pronouns, demonstrative pronouns and also other objects between which referential links are established are indexed with consideration of the link to their antecedent. That is, for the text block indicated in FIG. 1B, the object identities "David Cameron", "Prime Minister of the United Kingdom", "he", "his", "Prime Minister" will be set with this block or with the entire text. Restoration of referential links is carried out in the semantic structures with the aid of special rules (such as Referential rules which are a part of A Referential and Structural Control Description 856 (see FIG. 8)).

Then, the original sentence, syntactic structure of the original sentence and the language-independent semantic structure are indexed (108). The result is a set of a collection of indices (109). The index can usually be presented in a table, where each value of a textual feature (e.g., a word, expression or phrase, relation between the elements of the sentence, morphological, lexical, syntactic or semantic feature, as well as syntactic and semantic structures) in the document is associated with a list of addresses of their occurrences in that document. In one embodiment, morphological, syntactic, lexical and semantic characteristics, and also structures and structural fragments can be indexed in the same way as a word in the document is indexed.

In one embodiment, indices can include all or at least one value of the morphological, syntactic, and lexical semantic characteristics (parameters). These values or parameters are generated during a two-stage semantic analysis, described in more detail hereinafter. Indices can be used in many tasks involved in processing natural language, particularly in organizing semantic searches. According to one implementation, the morphological, syntactic, and lexical semantic descriptions are structured and stored in the database. This set of instructions may include, at minimum, the morphological language model, the model of syntactical constructions for the language, and lexical-semantic models. In one embodiment, for the analysis of complex language structures, recognition of the meaning of the sentence and the correct transfer of the information contained therein, an integrated model is used to describe the syntax and semantics.

FIG. 2 illustrates a diagram of a process for analyzing a sentence in accordance with one embodiment. In particular, a source sentence 212 is converted into a language independent semantic structure 252 through various structures. Using at least in part the process and structures illustrated in FIGS. 1A and 2, the lexical-morphological structure (222) is determined at the stage of analysis (106) from the source sentence (105). Next, a syntactic analysis, which may be implemented as a two-stage algorithm (a rough syntactic analysis and a precise syntactic analysis), is performed using linguistic models and information at various levels to compute probabilities and generate the most likely ("best") syntactic structure.

A rough syntactic analysis is applied to the source sentence and includes, in particular, the generation of all potential lexical meanings for words that make up the sentence or phrase, of all the potential relationships among them and of all potential constituents. All possible surface syntactic models are applied for each element of the lexical-morphological structure. Then, all possible constituents are created and generalized so as to represent all possible variations of the syntactic parsing of the sentence. The result is the formation of a graph of generalized constituents (232) for subsequent precise syntactic analysis. The graph of generalized constituents (232) includes all the potential links within the sentence.

The rough syntactic analysis is followed by precise syntactic analysis on the graph of generalized constituents, resulting in the "derivation" of a certain number of syntactic trees (242) that represent the structure of the source sentence. Construction of a syntax tree (242) includes a lexical selection for the nodes in the graph and a selection of the relationships between the nodes of the graph. A set of a priori and statistical scores may be used when selecting lexical variations or when selecting relationships from the graph. A priori and statistical scores may also be used both to evaluate the parts of the graph and to evaluate the entire tree. In one implementation, one or more syntactic trees are built or arranged in descending value. Thus, the best syntactic tree will be the first one constructed. At this time, the non-tree links are also checked and constructed. If the first syntactic tree is not appropriate, for example, because of the impossibility of establishing the necessary non-tree links, then the next syntactic tree is regarded as the best, and so on.

Since this lexical selection for the nodes of the graph and the selection of relationships between nodes takes place on the basis of a priori and statistical assessments, one implementation of the method not only examines and assesses all variants, but these variants also are stored and indexed at stage 108 with consideration of their integral estimates. That is, index 109 contains not only highly probable options from parsing sentences, but also the improbable options that are weighted correspondingly if this parsing is successful. The weight of the version from the parsing is then used in the calculation assessing the relevance of the search result.

A wide range of lexical, grammatical, syntactic, pragmatic and semantic features are derived at the stage (106) of the analysis and construction of semantic structures (107). For example, the system can derive and store lexical information and information about the affiliation of lexical units of semantic classes, information on grammatical forms and linear order, about syntactic relations and surface positions, the use of certain forms, of aspects, of tonalities such as positive and negative tonality, deep positions, non-tree links, semantics, etc.

In addition, at step 107, an ontological analysis can be conducted with the aim of deriving subject domain knowledge, ontological objects, and ontological facts. The derivation of ontological objects and ontological facts and fixing the relationship between them is carried out, for example, using a special type of rule, rules of logical inference, and other rules. This information is fixed in ontologies (110). For example, returning to the example illustrated in FIG. 1A, the ontology stores the information that David Cameron is the Prime Minister of Great Britain, that his address is 10 Downing Street, that he spoke at the Social Impact Investment Forum, and that this took place on Jun. 6, 2012 in London.

The information from the ontologies is used in the process of building indices (108). This then enables, in the search process, the retrieval of information about the object, even if it is expressed indirectly in the text corpora. For example, information from the fragment illustrated in FIG. 1B, if it is listed in the ontology, enables the provision of an answer to the question, "On what street is the residence of the Prime Minister of Great Britain?" or "When did a coalition government operate in Great Britain?".

Figure 3:
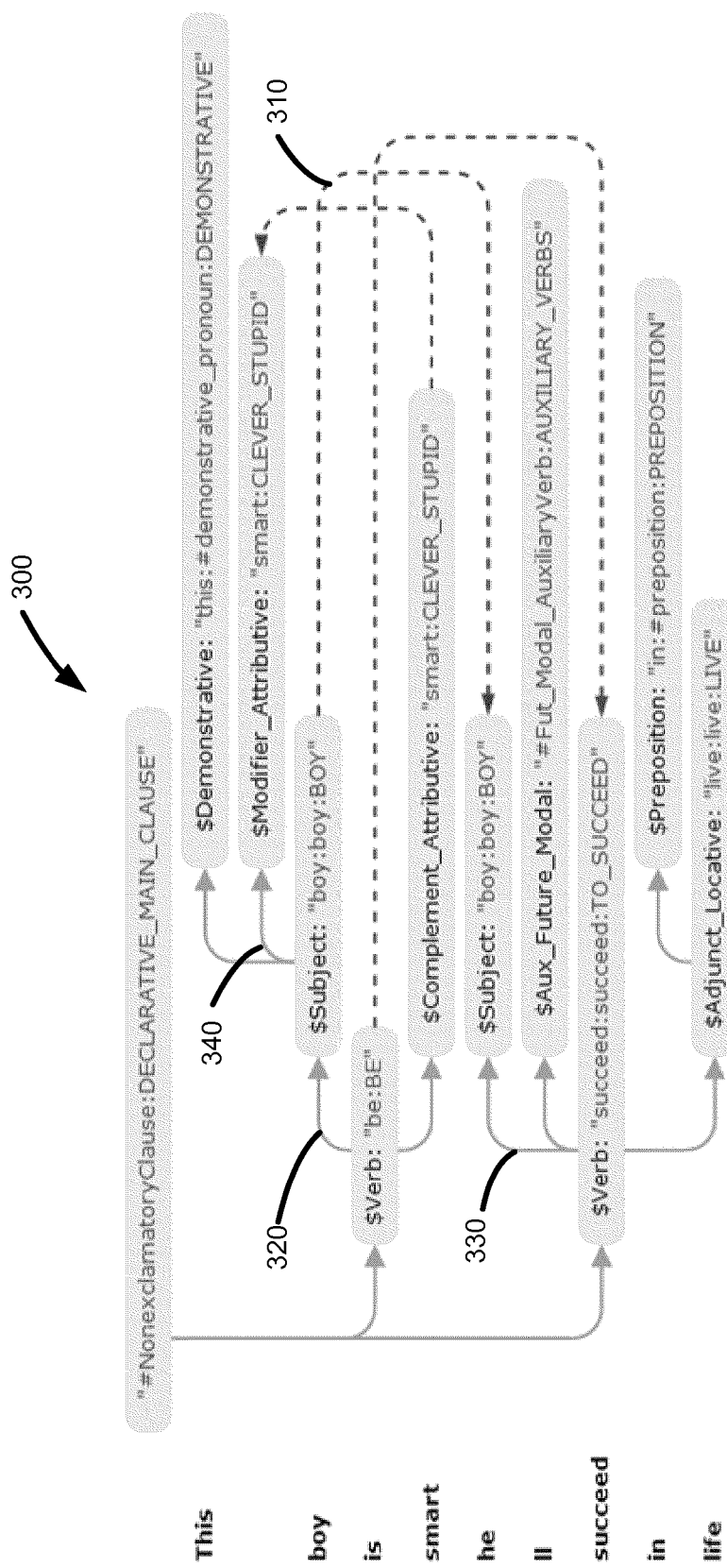
FIG. 3 illustrates a syntactic tree obtained as a result of a precise syntactic analysis of the English sentence "This boy is smart, he'll succeed in life."

FIG. 3 illustrates an example of a syntax tree (300) resulting from a precise syntactic analysis of the English sentence "This boy is smart, he'll succeed in life." The tree 300 is sufficiently complete in terms of syntactic information such as lexical meanings, parts of speech, syntactic roles, grammatical meanings, syntactic relationships (positions), syntactic models, types of non-tree links and so forth. For example, the pronoun "he" is defined in relationship to the noun "boy" as the subject of an anaphoric link (310). "Boy" is defined as the subject (320) of the verb "be." "He" is defined as the subject (330) of the verb "succeed." The adjective "smart" turns out to be related to the noun "boy" with the "control—complement" (340) relationship.

Referring to FIG. 2, this approach of two-stage syntactic analysis provides the construction of the best syntactic structure (246) for the given sentence, selected from one or several syntactic structures. FIG. 3 depicts a schematic of the best syntactic structure resulting from a syntactic analysis of the English sentence "This boy is smart, he'll succeed in life." The two-stage analysis approach follows the principle of cohesive goal-driven recognition, i.e., hypotheses about the structure of a part of the sentence are checked using the existing linguistic models within the framework of the entire sentence. As a result of this approach, there is no need to analyze a number of dead-end versions of a parsing. This approach may allow a substantial reduction of the computer resources required to analyze a sentence.

Figure 4:
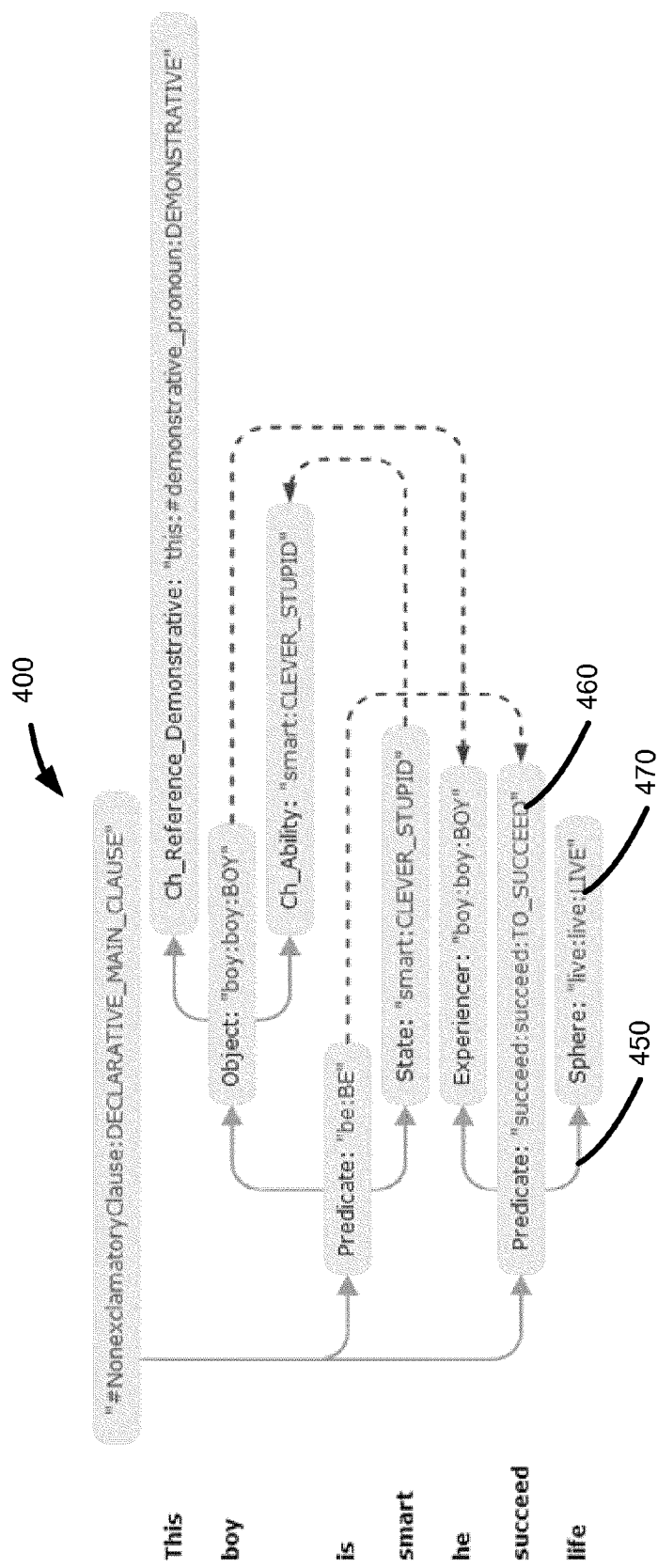
FIG. 4 illustrates a semantic structure obtained as a result of analysis of the English sentence "This boy is smart, he'll succeed in life"

The proposed method of analysis supports the attainment of maximum precision in determining the meaning of the sentence. FIG. 4 illustrates an example of a semantic structure resulting from an analysis of the English sentence "This boy is smart, he'll succeed in life." This structure contains all the syntactic and semantic information such as semantic classes, semantemes (not shown in the drawing), semantic relations (deep positions), non-tree links, etc.

The language-independent semantic structure of the sentence is represented as an acyclic graph (trees, supplemented by non-tree links) where each word of a specific language is replaced with universal (language-independent) semantic entities called semantic classes. A semantic class is a semantic characteristic that may be derived and used for completing tasks in the semantic search, classification, clustering and filtering of documents written in one or more languages. Moreover, semantemes can be used as information in the language-independent structures, reflecting not only semantic, but also syntactic, grammatical, and other language-dependent information.

Semantic classes can be arranged in a semantic hierarchy where a "daughter" semantic class and its "descendants" inherit much of the properties of the 'parent' and all previous semantic classes ("ancestors"). For example the semantic class SUBSTANCE is a daughter class of the rather broad class ENTITY and at the same time is a "parent" for semantic classes GAS, LIQUID, METAL, WOOD_MATERIAL, etc. Each semantic class in a semantic hierarchy is covered by a deep (semantic) model. The deep model is a set of deep slots (types of semantic relationships in sentences). Deep slots reflect the semantic roles of daughter constituents (i.e., structural units of a sentence) in various sentences with items from this semantic class as the core of a parent constituent and possible semantic classes as items filling the slot. These deep slots reflect the semantic relationships between constituents, such as "agent," "addressee," "instrument" or "quantity." The daughter class inherits and tweaks the deep model of the parent class.

Figure 5A:
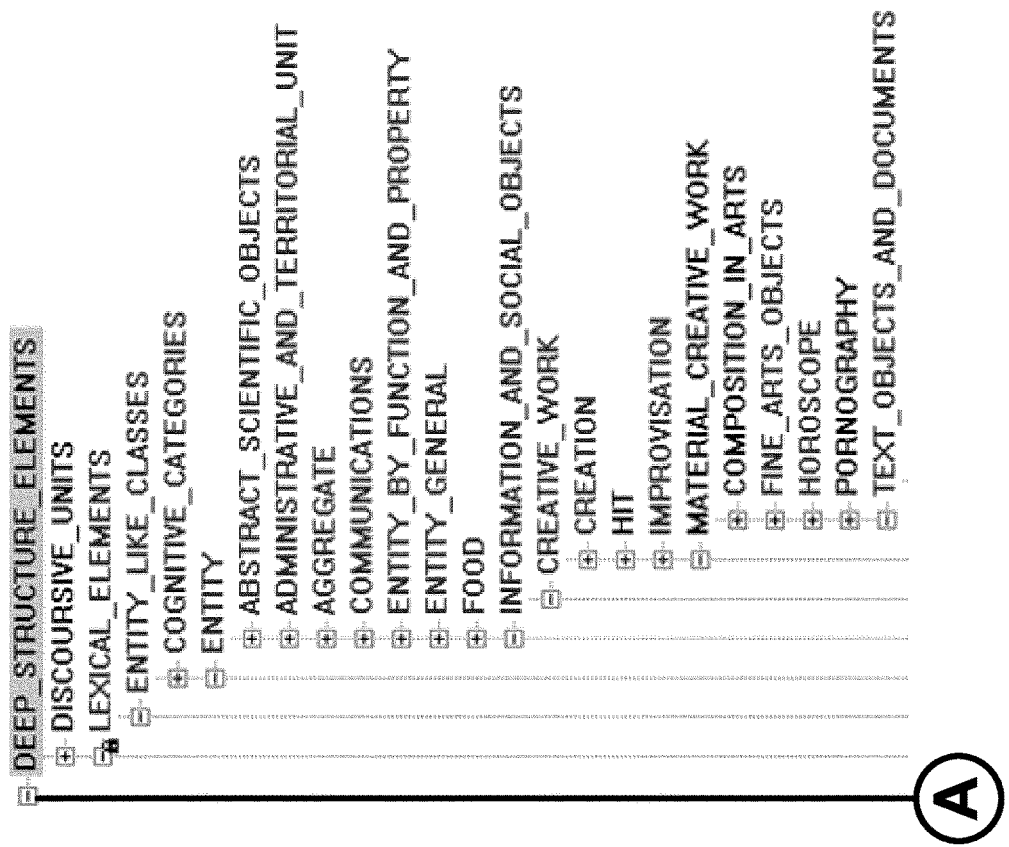
Figure 5B:
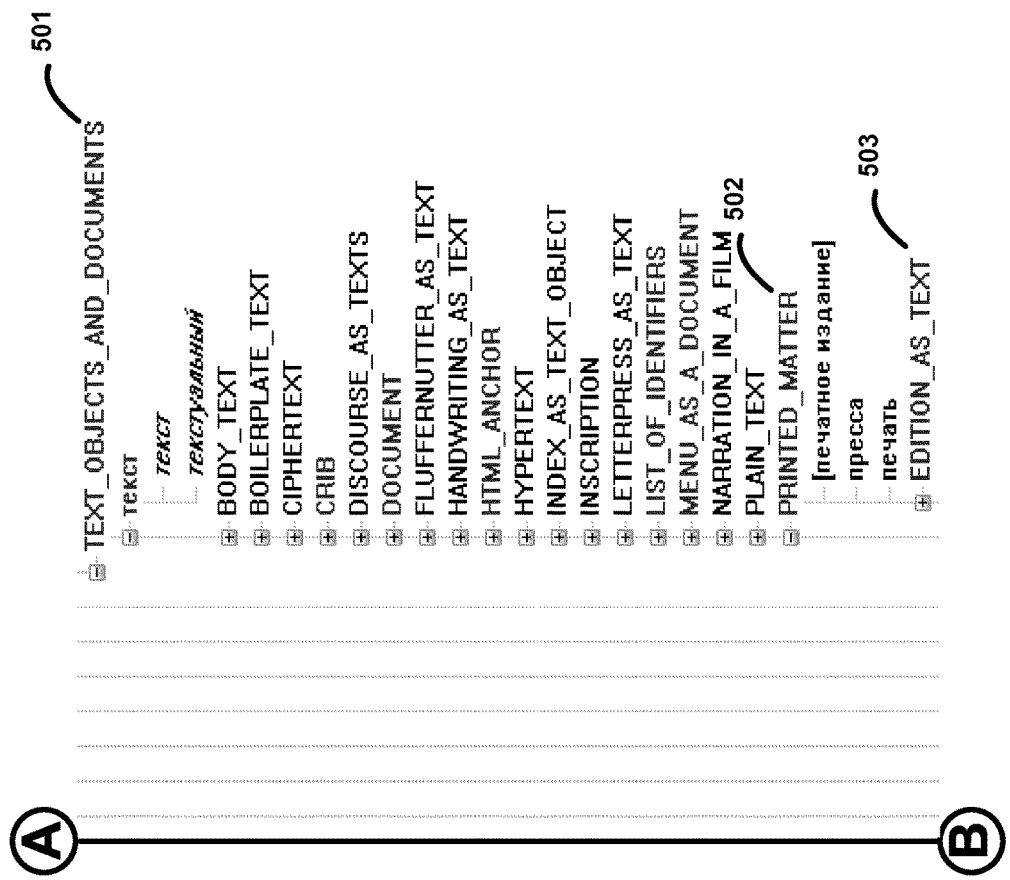
Figure 5C:
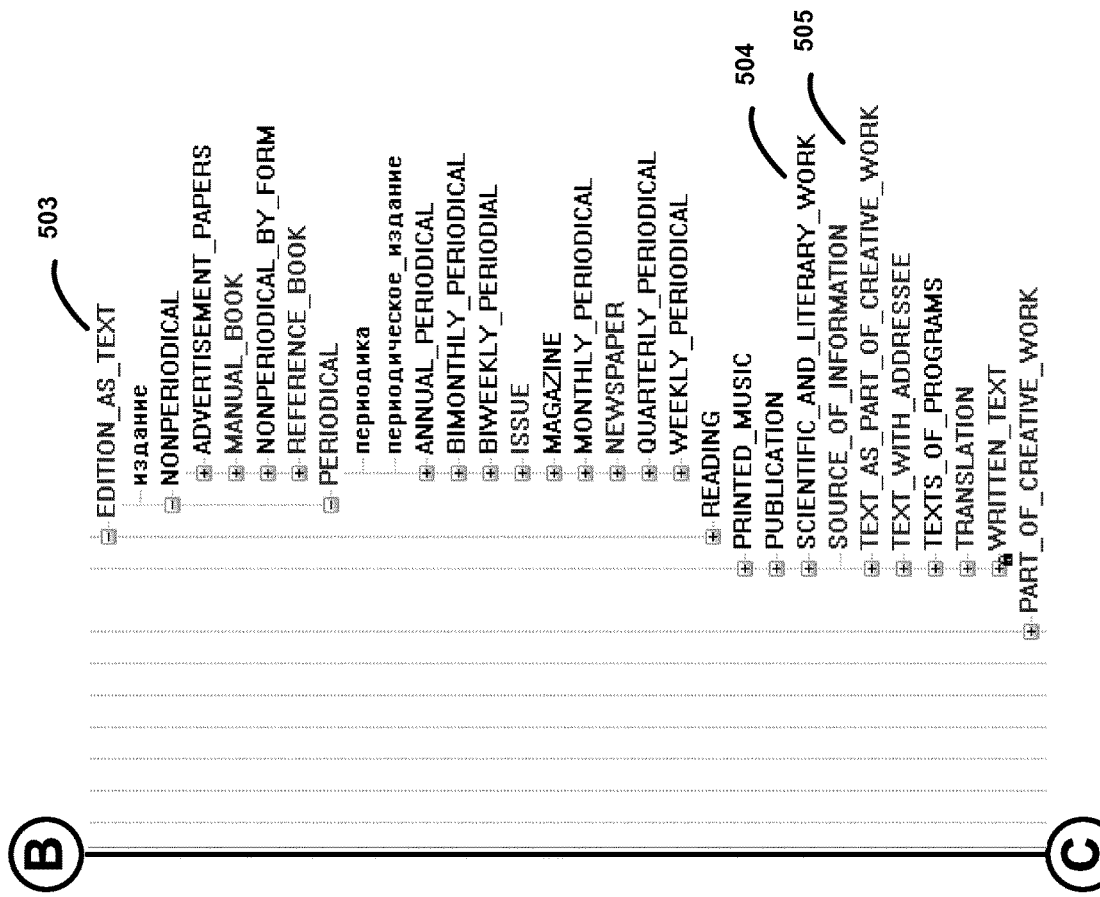

FIGS. 5A-5D each illustrate a fragment of a semantic hierarchy according to one embodiment. The semantic hierarchy is set up such that broader concepts are located at the top levels of the hierarchy. For example, in the case of documents, types of which are illustrated in FIG. 5B, and FIG. 5C, the semantic classes—PRINTED_MATTER (502), SCIENTIFIC_AND_LITERARY_WORK (504), TEXT_AS_PART_OF_CREATIVE_WORK (505) and others—are descendants of the class TEXT_OBJECTS_AND_DOCUMENTS (501) while the class PRINTED_MATTER (502), is in turn a parent for the semantic class EDITION_AS_TEXT (503), which contains the classes PERIODICAL (periodicals) and NONPERIODICAL, where PERIODICAL is the parent class for the classes ISSUE, MAGAZINE, NEWSPAPER, etc. The approach to division into classes may vary. The systems and methods described herein are based on the use of concepts that are independent of the language.

Figure 6:
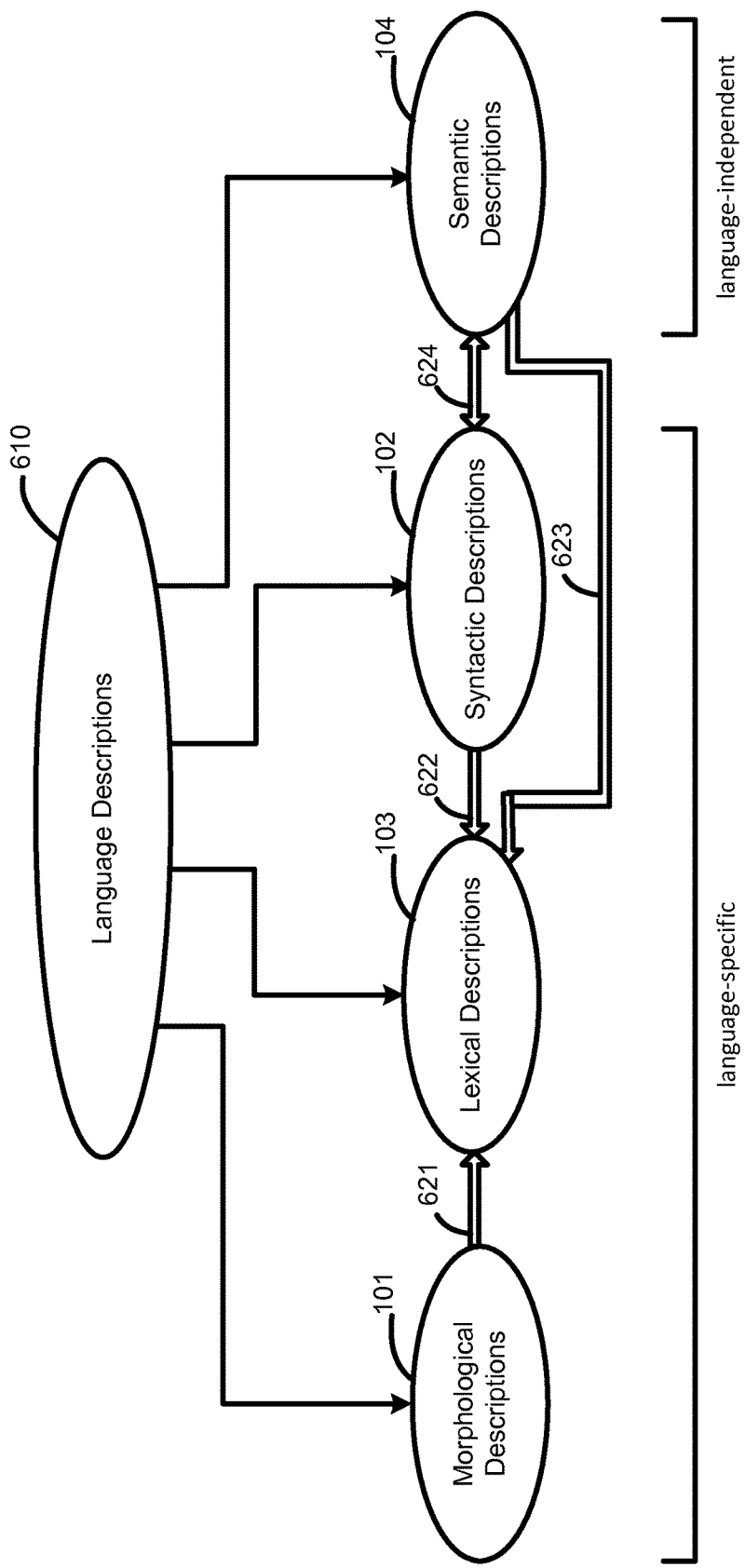
FIG. 6 is a diagram illustrating linguistic descriptions.
Figure 7:
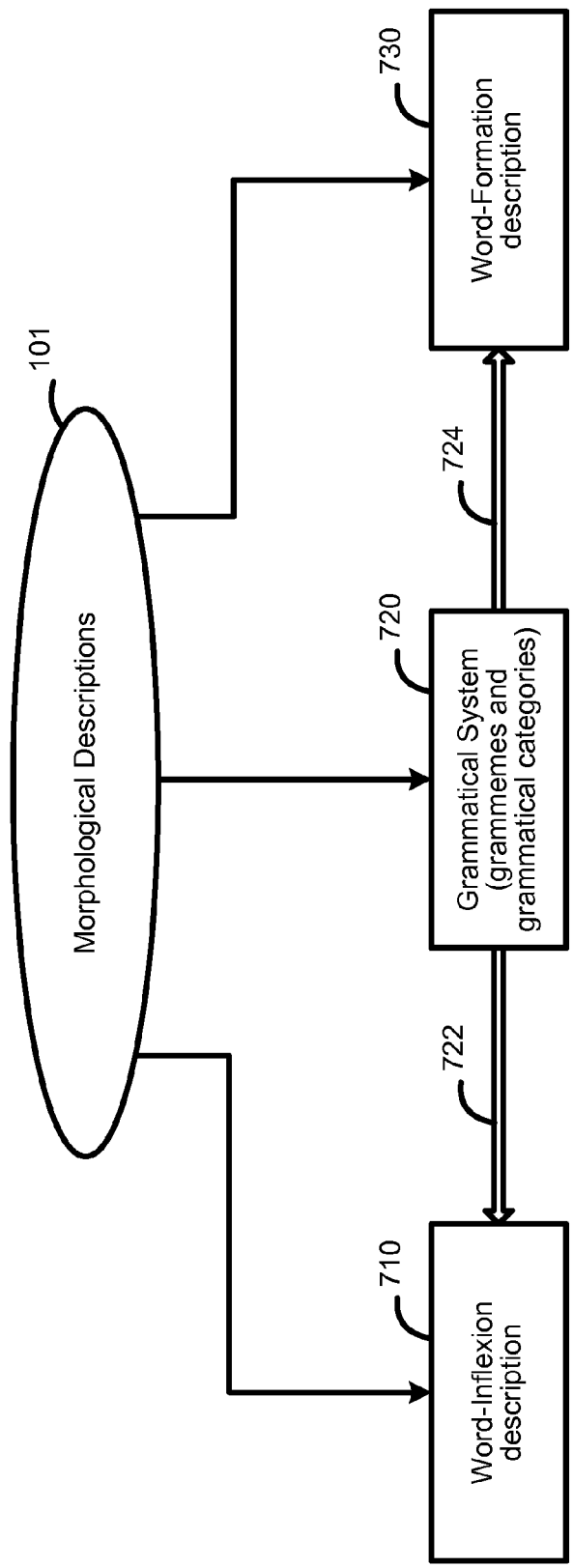
FIG. 7 is a diagram illustrating morphological descriptions.
Figure 8:
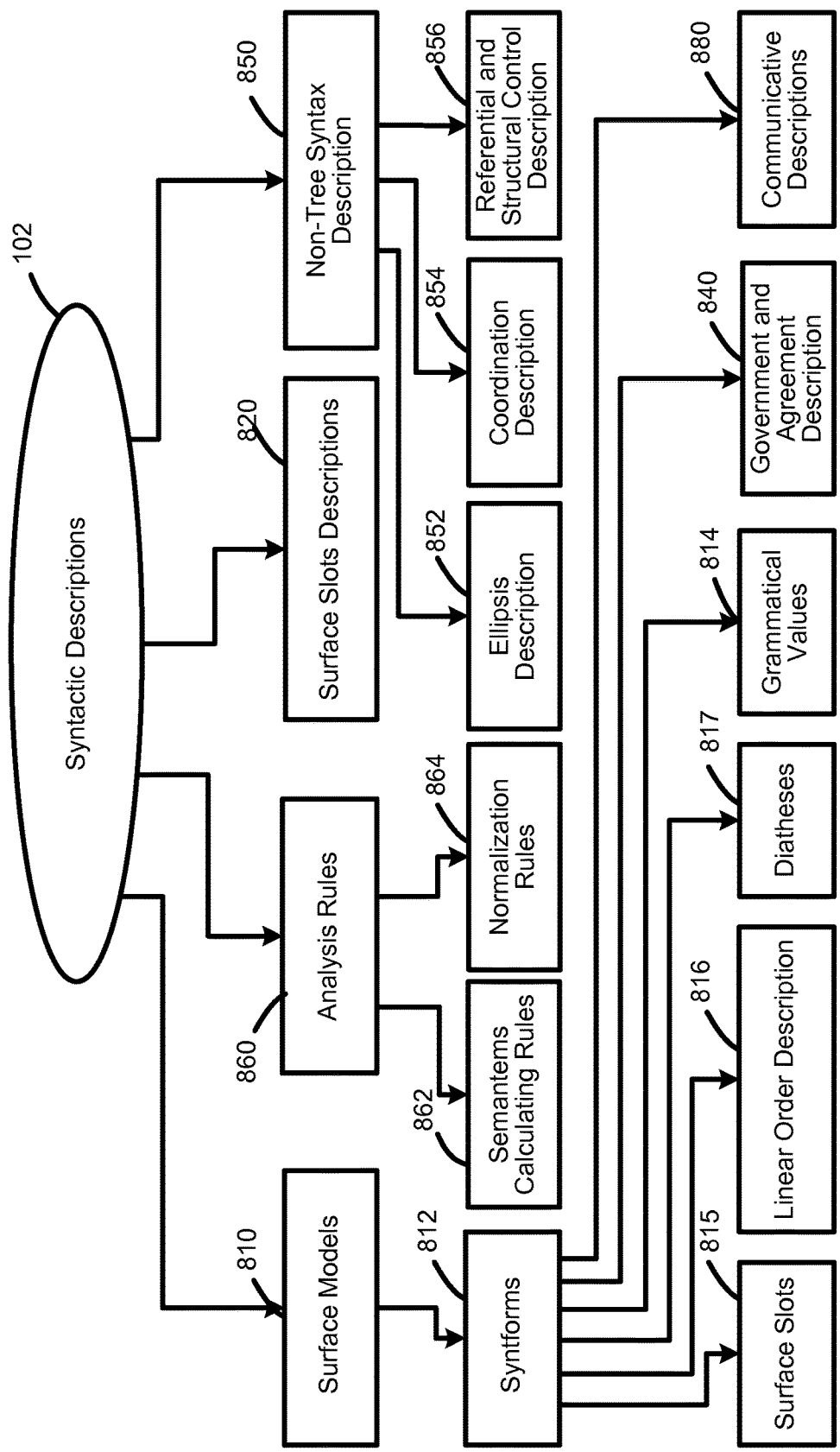
FIG. 8 is a diagram illustrating syntactic descriptions.
Figure 9:
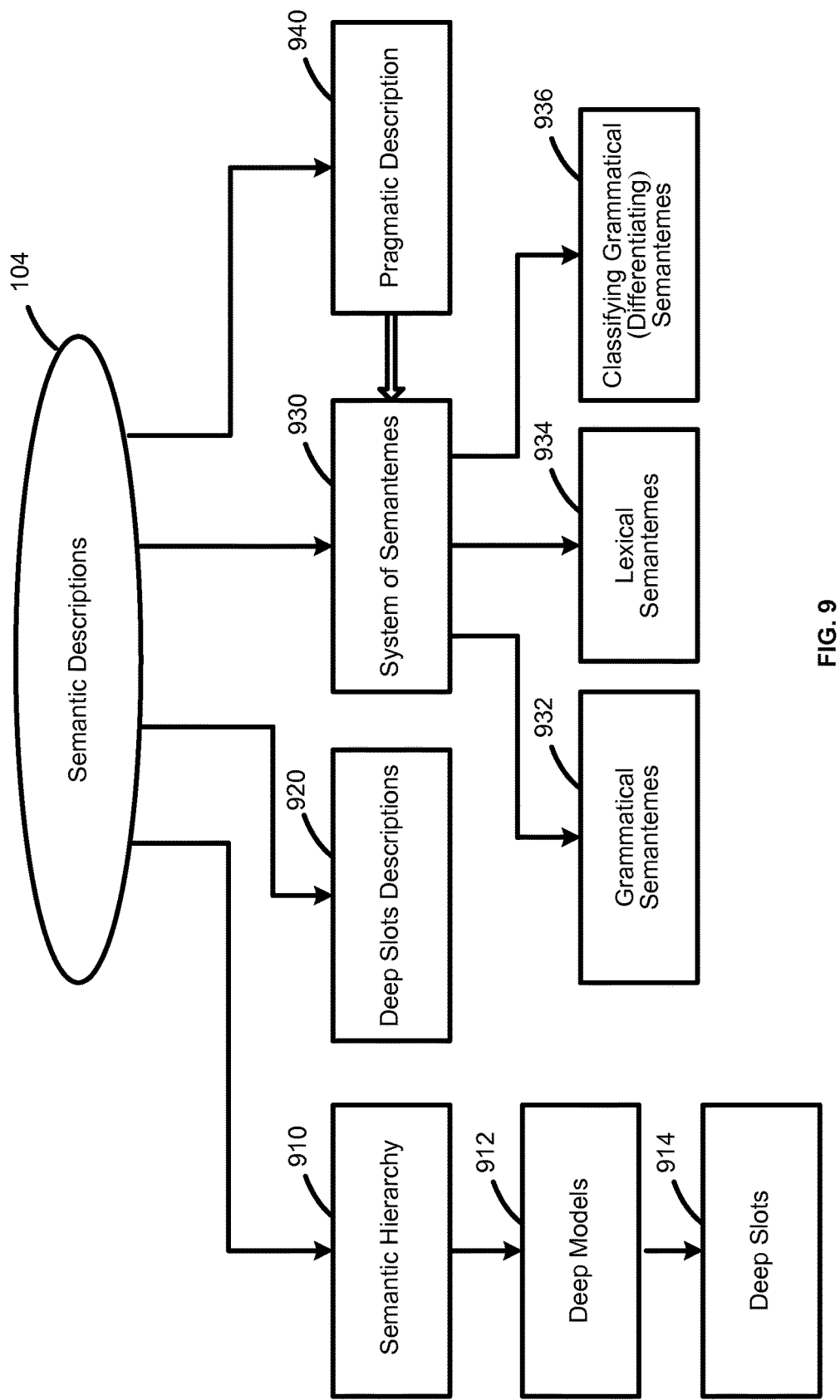
FIG. 9 is a diagram illustrating semantic descriptions.

FIG. 6 is a diagram illustrating language descriptions (610) according to one embodiment. Language descriptions (610) include morphological descriptions (101), syntactic descriptions (102), lexical descriptions (103) and semantic descriptions (104). Language descriptions (610) are combined into a general concept. FIG. 7 is a diagram illustrating morphological descriptions according to one embodiment. FIG. 8 shows syntactic descriptions according to one embodiment. FIG. 9 shows semantic descriptions according to one embodiment.

Referring to FIG. 6 and FIG. 9, as part of the semantic description (104), the semantic hierarchy (910) is a characteristic of linguistic descriptions (610) that integrates language-independent semantic descriptions (104) and language-dependent lexical descriptions (103), as indicated by a double arrow (623), and morphological (101) and syntactic descriptions (102), as indicated by a double arrow (624). A semantic hierarchy may be created at the same time and may later be filled in for each specific language. The semantic class in a specific language includes lexical meanings with the corresponding models. Semantic descriptions (104) are language-independent. Semantic descriptions (104) may contain a description of deep constituents and may contain a semantic hierarchy, descriptions of deep slots, and a system of semantemes and pragmatic descriptions.

Referring to FIG. 6, the morphological descriptions (101), lexical descriptions (103), syntactic descriptions (102) and semantic descriptions (104) are linked. Lexical meanings may have several surface (syntactic) models depending on the semantemes and pragmatic characteristics. The syntactic descriptions (102) and semantic descriptions (104) are also linked. For example, a diathesis of syntactic descriptions (102) may be seen as an "interface" between the language-dependent surface models and the language-independent deep models of the semantic description (104).

FIG. 7 illustrates components of morphological descriptions (101). As was previously shown, the constituents of morphological descriptions (101) include, but are not limited to, word-inflextion descriptions (710) and of the grammatical system (grammemes) (720) and word formation description (730). In one embodiment, the grammatical system (720) includes a set of grammatical categories such as "part of speech," "case," "gender," "number," "person," "reflexive," "tense," "aspect," and their significance, hereinafter called grammemes. For example, grammemes denoting parts of speech can include an adjective, noun, verb, etc.; case grammemes may include "Nominative", "Genitive", "Dative" etc.; gender grammemes may include "Male", "Female", "Neuter", etc.

Word-inflextion descriptions (710) describe how the base form of the word may vary depending on case, gender, number, tense, etc. and broadly include all possible forms of the word. Word formation (730) describes what new words can be constructed using this word. Grammemes are units of the grammatical system (720) and, as indicated in link (722) and link (724), grammemes can be used to construct word-inflextion descriptions (710) and word formation descriptions (730).

FIG. 8 illustrates components of syntactic descriptions (102). The components of the syntactic descriptions (102) may contain surface models (810), surface slot descriptions (820), referential and structural control descriptions (856), governance and agreement descriptions (840), non-tree syntax descriptions (850), and analysis rules (860). The syntactic descriptions (102) are used to construct possible syntactic structures for the sentence in a given source language, taking into account word order, non-tree syntactic phenomena (e.g., coordination, ellipsis, etc.), referential relationships and other considerations.

FIG. 9 illustrates components of semantic descriptions (104) according to one embodiment. While the surface slots (820) reflect the syntactic relationships and the means to implement them in a specific language, deep slots (914) reflect the semantic role of daughter (dependent) constituents in deep models (912). Therefore, surface slot descriptions, and more broadly of surface models, can be specific for each language. The deep slots descriptions (920) contain grammatical and semantic limitations on items that can fill these slots. The properties and limitations for deep slots (914) and the items that fill them in deep models (912) may be very similar or identical for different languages.

The system of semantemes (930) represents a set of semantic categories. Semantemes may reflect lexical and grammatical categories and attributes as well as differential properties and stylistic, pragmatic and communication characteristics. For example, the semantic category "DegreeOfComparison" may be used to describe degrees of comparison expressed in different forms of adjectives, such as "easy," "easier" and "easiest." Likewise, the semantic category "DegreeOfComparison" may include semantemes, such as "Positive," "ComparativeHigherDegree," and "SuperlativeHighestDegree." As another example, the semantic category "RelationToReferencePoint" can be used to describe the linear order—before or after the object or event is located in the sentence and the link to it, with the semantemes being "Previous", "Subsequent". In another example, the semantic category "EvaluationObjective" can fix the presence of an objective assessment, such as "Bad", "Good", etc. Lexical semantemes can describe the specific properties of objects, such as "being flat" or "being liquid" and are used in limiting the placeholders of the deep slots. Classifications of differential semantemes are used to express differential properties within a single semantic class. For example, in English, "hairdresser" for men is translated as "barber", and in the semantic class "HAIRDRESSER" it will be assigned the semanteme "RelatedToMen", while in the same semantic class we find "hairdresser" and "hairstylist" and so on.

Pragmatic descriptions (940) are used to assign a corresponding theme, style or genre to text during the parsing process, and it is also possible to ascribe the corresponding characteristics to objects in the semantic hierarchy. For example, "Economic Policy", "Foreign Policy", "Justice", "Legislation", "Trade", "Finance", etc.

Figure 10:
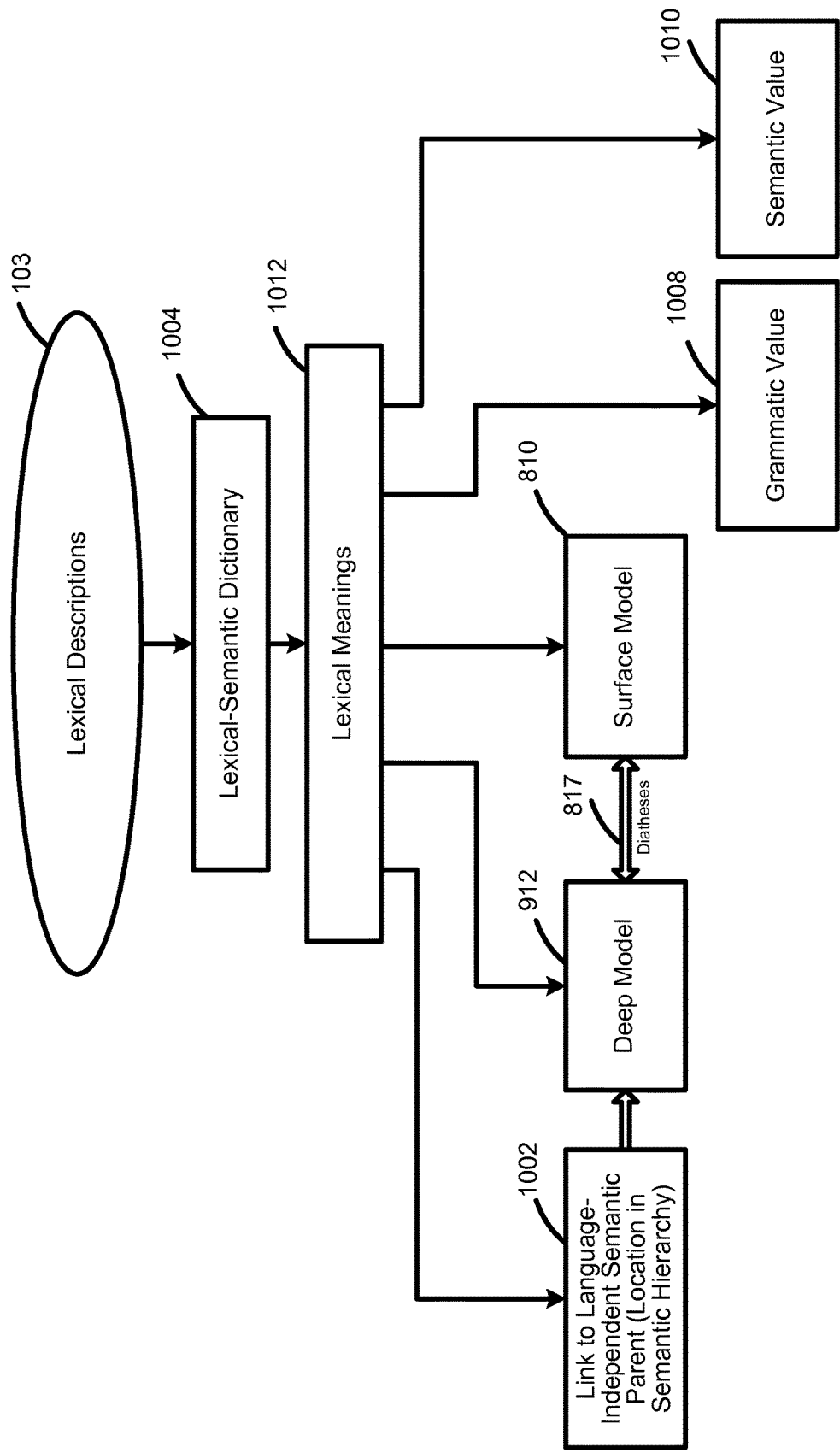
FIG. 10 is a diagram illustrating lexical descriptions.

FIG. 10 is a diagram illustrating components of lexical descriptions (103) according to one embodiment. Lexical descriptions (103) include a lexical-semantic dictionary (1004), which includes a set of lexical meanings (1012) that, along with their semantic classes, form a semantic hierarchy where every lexical meaning may include, but not be restricted by, its deep model (912), its surface model (810), its grammatical value (1008) and its semantic value (1010). The lexical meaning may link together various derivatives (such as words, expressions and phrases) that express a thought using various parts of speech, various forms of a word, words with the same root and other things. In turn, a semantic class joins the lexical meanings of words and expressions that are close in meaning in different languages.

Any parameter of linguistic description (610)—lexical meanings, semantic classes, grammemes, semantemes and more—are removed during an exhaustive analysis of the text, and any parameter can be indexed (an index specification is created). Indexing semantic classes is required in many tasks related to the analysis of natural language texts, such as semantic search, classification, clustering, filtering of texts, and much more. Indexing lexical meanings (as opposed to simply indexing the word alone) enables searches of not just words or word forms, but of the lexical meaning, that is, words in a particular meaning Syntactic structure and semantic structure can also be indexed and stored for use in semantic search, classification, clustering, and document filtering.

Returning to FIG. 1, after the universal semantic structure is constructed for each sentence of each text in the corpus, syntactic and semantic structures are indexed. The lexical meanings are indexed as the result of the lexical selection at each vertex of the semantic structure, and each parameter of the morphological, syntactic, lexical and semantic descriptions can be indexed in the same way as ordinary words. The index of words in a document usually includes at least one table, where each word (lexeme or word form) encountered in the document is accompanied by a list of numbers or addresses of positions in this document. According to one embodiment, an index is built for all lexical meanings, all semantic classes, for any value of the morphological, syntactic, lexical and semantic parameters. These values are generated in a two-step process of syntactic and semantic analysis, and the resulting indices can be used to achieve higher accuracy and relevance in semantic searches in natural language text corpora. For example, the user can formulate a query with the option of searching sentences with nouns that have the property "being flat" or "being liquid", or sentences containing words (nouns and/or verbs), denoting a process such as production, destruction, displacement, etc.

In one embodiment, a combination of two, three or, generally speaking, N numbers can be used for indexing different syntactic, semantic, or other parameters. For example, combinations of two numbers—indexes of words that in the text are linked by a relationship corresponding to the given slot—can be used to index the surface or deep slots. For example, for the semantic structure of the sentence "This boy is smart, he'll succeed in life", depicted in FIG. 4, the deep slot 'Sphere' (450) relates to the lexical meaning "succeed:TO_SUCCEED" (460) with the lexical meaning "life:LIVE (470)". More specifically, the lexical meaning "life:LIVE" fills the deep 'Sphere' of the verb "succeed: TO_SUCCEED". When building an index of lexical meanings, the occurrences of these lexical meanings are assigned numbers according to their position in the text, for example, N1 and N2. When building the index of deep slots, each deep slot is assigned according to lists of its occurrence in the document. For example, the index of the deep slot 'Sphere' will include, among others, the pair (N1, N2).

Since not only words are indexed, but also their lexical meanings, semantic classes, syntactic and semantic relations, and any other elements of syntactic and semantic structures, it becomes possible to search the context using not only key words, but also using the context containing lexical meanings, meanings belonging to specific semantic classes, context including elements with specific syntactic and/or semantic features and/or morphological features or sets (combinations) of such features. Additionally, sentences may be found with non-tree syntactic phenomena, such as ellipses, parataxis, etc. Because semantic classes may be searched, it becomes possible to search semantically linked words and concepts.

Searches of fragments of syntactic and/or semantic structures can be done. The search result may include sentences or paragraphs, or other fragments, depending on the selection of the corresponding option by the user. Because all sentences in each corpus are analyzed and then saved along with the results of their syntactic and semantic analysis, syntactic and semantic structures can be produced for the user in graphical form as well.

The most widespread searching in search systems is performed using keywords. But a problem arises when one or more keywords are multi-valued, for example, in English a "bank" can mean 1) a financial institution, bank, 2) storage, repository, and 3) the shore of a river or lake. There are still more, less frequently occurring meanings of "bank." In such a case, in response to the query using such a keyword, the user of standard search systems receives a set of results that are of no use to him. For example, most of the hits resulting from a standard search for the keyword "apple" relate to the name of the computer corporation, since it is encountered much more frequently in Internet resources; it is virtually impossible to find documents mentioning the fruit "apple" (they turn up on the most distant pages) without attaching additional words (e.g., "fruit") to the request or an exclusion in a specially formulated computer lexicon.

As shown in FIGS. 11A-B, the user can specify one of the possible lexical meanings for the keyword. For example, FIG. 11A shows the user interface for the search system containing the query box (1101) and button "Search" (1102), and in addition, a pop-up window is shown (1103) with a list of lexical meanings for the word "centre", which is displayed to the user enabling him to select the appropriate meaning of the word "centre" when the cursor is placed over this word. The user can see that the word "centre" has several meanings located in different semantic classes. The user may select one or more of the options provided in the list of meanings for the word. In one implementation, to select the one or more meanings from the list of the possible meanings of the word, the user may tap on the desired meaning(s) if using a touch screen display or click on the desired meanings if using a mouse (e.g., using the mouse button). In other embodiments, the list of meanings associated with a word in the query may be shown to the user in any other manner (e.g., showing the list of meanings as part of a page of the user interface).

There are different ways of specifying the lexical meaning including, but not limited to, by specifying a semantic class. Another way is to provide each lexical meaning with an explanation similar to a dictionary entry, as shown in FIG. 11A, or to indicate the closest synonymous meanings.

The user can select any possible lexical meaning of the word for the search, and this meaning becomes the selected one and is shown as marked, for example, as shown in FIG. 11B. If the query contains several words, lexical meanings from the corresponding semantic classes can be specified for any or all of them.

Regardless of whether the user specifies the meanings for the query words, the user can see, for example, in the retrieved fragment (e.g., by clicking on the right mouse button or by tapping on a touch screen of the computing device utilized by the user), in which lexical meaning the word occurs, its semantic class, and also several other parameters, such as synonyms, the syntactic model, co-occurrence, examples of phrases with the word, etc. A sample of this kind of query is shown in FIG. 11C.

In some embodiments, the user may attach the Boolean operators AND, OR and NOT to the lexical meanings, that is, to the keywords that have been assigned to corresponding semantic classes.

A list of settings (1104) or parameters may be set by the user. For example, the user may set whether the word order is essential to the search. Another setting may allow the user to limit the space between the query objects. For example, the user can use the operator W/n to search for documents that contain no more than n words between the query objects. In one implementation, the user can use it explicitly, in others they can use it to select an optional length.

The user may indicate that the search includes synonyms of the one or more words used in the query. Synonyms are words that have the same or very similar meanings. In the semantic hierarchy, all synonymous lexical meanings, such as "food," "meal," "alimentary" are located in the same semantic class and have the same or close semantic characteristics and are sememantemes. Then, if the user selects a setting or option "Search synonyms" (1104), and wants to find "food," first the lexical meaning is determined, its semantic class, and as a result, documents can be found where "meal" or "alimentary" occur or, possibly, other more archetypal representatives of the semantic class FOOD. A measure of relevance can be introduced, for example, based on the assessment of the "closeness" of the lexical meaning from the query to the synonym found, and, taking into account context, the word order and other factors, it can be extended to a sentence, a fragment, etc.

There is still another way to specify the lexical meaning of words that are in the query, if the query is presented as part of a phrase or sentence, and that is its complete syntactic and semantic analysis. Many words in languages have several different meanings, senses. Some words in the query can have different meanings expressed in different lexical meanings To determine exactly which lexical meaning of the word applies to the query, a complete syntactic and semantic parsing of the query submitted as a sentence or phrase is performed to define the lexical meanings of the words constituting the query. An exhaustive syntactic analysis includes a rough and a close analysis. The rough analysis defines all the potentially possible meanings for each word. The close analysis, which is based on linguistic descriptions, language rules, co-occurrences, and on analysis of context, statistics and other factors, generates the most relevant lexical meanings Thus, as a result of the lexical selection from the close analysis, a semantic class is determined for each word in the user query.

FIG. 11E illustrates an example of a graphical user interface showing search results for a user's query, which is in the form of a phrase. As shown, the user can check exactly which lexical meaning of the word will be searched in the documents of a text corpus. The retrieved documents can contain all (or the majority) of the query words in the selected meanings. The word order can be integral to the query or not in accordance with the settings selected by the user. In one of the implementations, word order can be required by default. The search engine also can seek documents with an arbitrary order of query words, as well as with the maximum distance assigned between them, but in this case the estimation of relevance to the retrieved document can be lower. In another implementation, the user is presented with the option of including word order in the search or not.

Figure 12B:
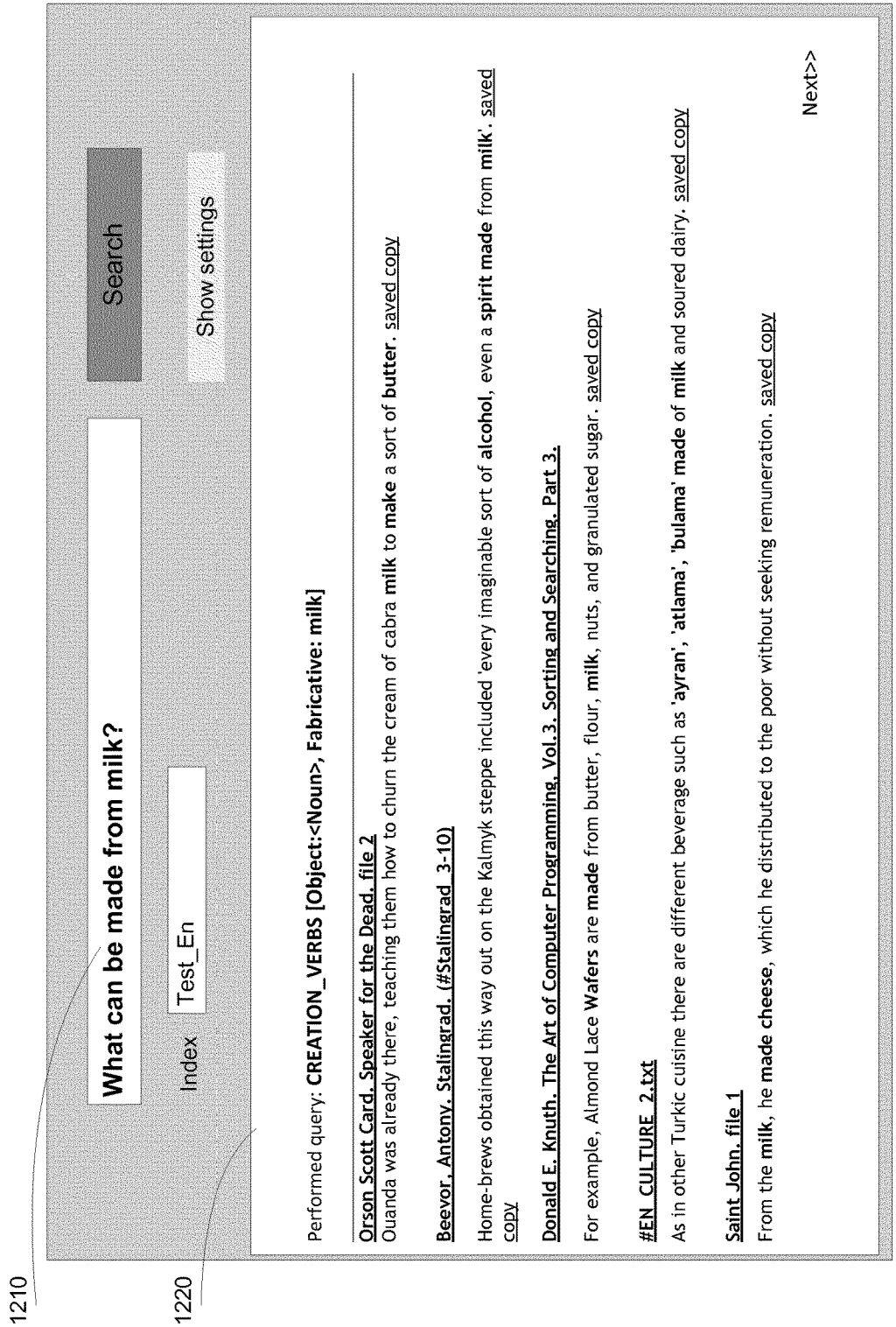
Figure 12C:
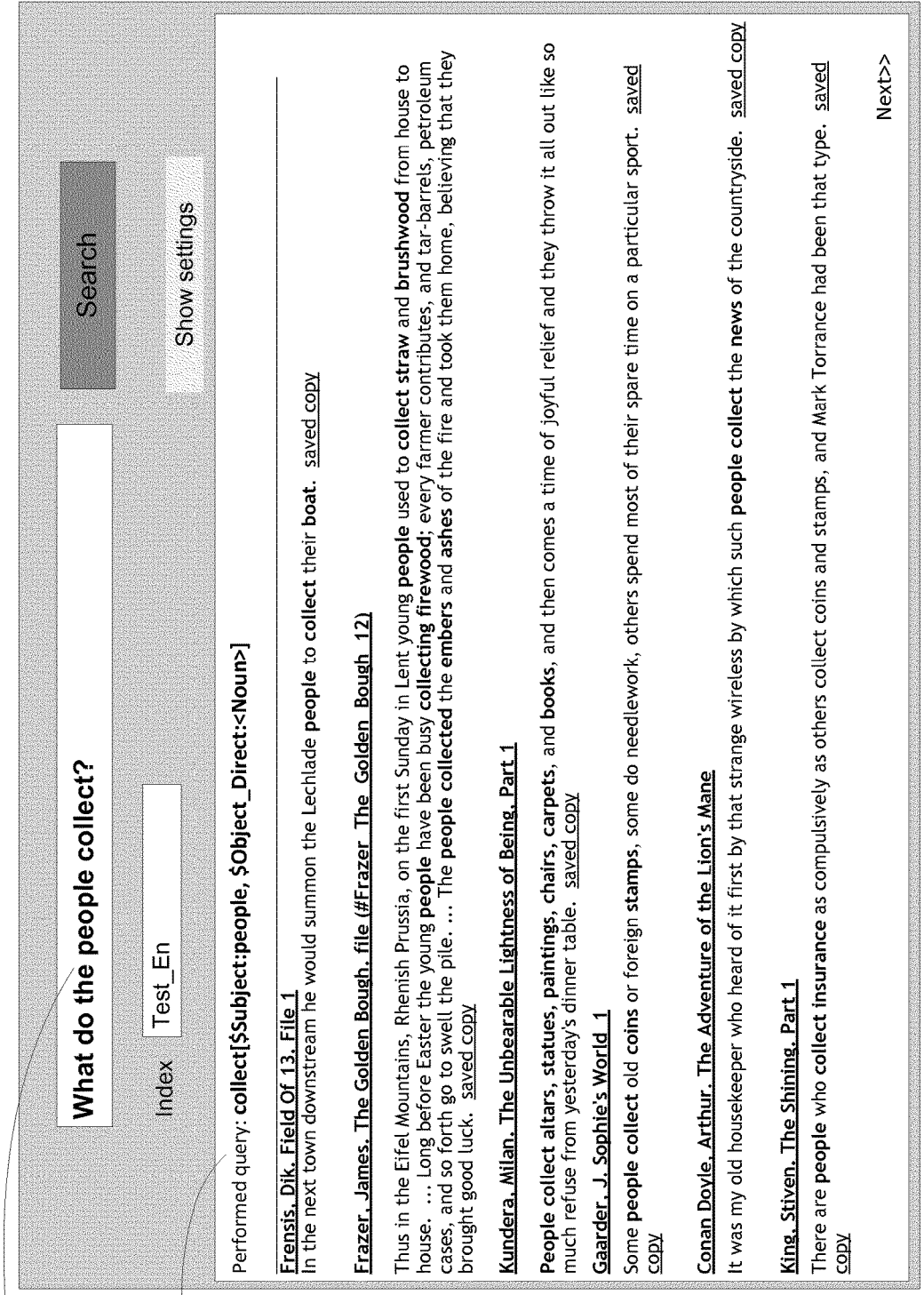

FIGS. 12A-12C illustrate graphical user interfaces displaying search results of user queries formulated as questions in natural language. FIG. 12A shows an example of search results answering a query question "What countries were discovered?". The query in the natural language is analyzed by the same parser used to perform pre-analysis of the text corpus, and is converted to the semantic query. The query window (1210) displays the query formulated in natural language, and in the terminology of semantic classes and relationships it looks, for example, like "discover [object:"COUNTRY"]," and means that the semantic search engine seeks sentences with the English verb "discover" and with the object belonging to the semantic class COUNTRY. The search results are shown in the window (1220).

Another example of a semantic query in a sentence form is shown in FIG. 12B. The search results answer the query question "What can be made from milk?" It is also formulated in natural language and is transmitted to the semantic query "CREATION_VERBS [Object:<Noun>, Fabricative: milk]," where "CREATION_VERBS" is the semantic class of verbs denoting the process of creating such as "to make", "to produce", "to manufacture", "to prepare", etc. Any of these verbs belonging to the semantic class "CREATION_ VERBS" can be found in the text corpus. "Fabricative" designates a deep (semantic) slot "raw material," from which something is produced, the raw material in the given query, which is "milk". Thus, the result should be a noun (<Noun>) filling the semantic slot "Object" in the sentence. The search results are shown in the window (1220).

Another example of a query to a semantic search engine is displayed in FIG. 12C. In terms of content, the query asks "What do people collect?" (What do people collect?). In the terminology of a semantic query, as shown in box 1310, the query is displayed as follows: "collect[$Subject:people, $Object_Direct:<Noun>]". The semantic search engine seeks sentences with the verb "collect" and the word "people" which fill the surface slot "Subject". The goal of the search is to find a noun or nouns in the role of the direct object of the verb "collect". The search results are shown in the window (1220).

In one implementation, all the morphological forms of words designated in the query are taken into account and all the morphological forms can be found. The limitations to the morphological forms can be included in the query in the form of a limitation on grammatical meanings, and can be indicated, for example, in angle brackets < >. The index that is generated using these methods is an integral part of the semantic search.

In one embodiment, users can formulate questions for a semantic search in natural language. The same parser that is used for syntactic and semantic analysis of the text corpus is applied to the syntactic and semantic analysis of the user's question, and is recognized by its syntactic structure and based on the language-independent semantic structure, and thus effects the "recognition" by the system of the meaning of the sentence. The constructed semantic structure then transmits the language of the search engine queries. For example, the aforementioned questions "What countries were discovered?" or "What can be made from milk?" originally formulated by the user in natural language is processed by the parser and translated into a semantic query. If the query is formulated as an interrogative sentence, then as a result of the analysis, the sentence structure is constructed, which can be a potential answer to the question, in this case, containing a lacuna.

Indices of syntactic and semantic structures are created and stored in the form of a tree or a graph. The desired structure is described by a search query using one or more search parameters. One or more parameters can be defined, can be specified using variables, and may be defined as a range of possible values of these variables. In other words, the query for the search can be presented as a sentence in natural language with "lacunae." Lacunae can be covered or include both single words and word combinations, phrases, groups of words that form related components (a constituent), embedded (subordinate) sentence, etc. As a result of the query and search, there are options for filling these lacunae in the texts available in the markup of the text corpus. For display to the user, they can be sorted by frequency of occurrence.

FIG. 13 shows an exemplary query that uses a variable to denote "lacunas" in the searchable sentence. The query corresponds to the question in English "What do the people think about?". Query "[$Subject: [ . . . [people]]] think" shows the option of a search of sentences of a specific structure. In this implementation, the variable, for example, [$ Subject: [ . . . [people]]] is used to describe the desired proposal including the noun phrase with the core "people", filling the syntactic (surface) slot of the "Subject" and the verb "think" in any form.

The method makes it possible to search a wide range of entities, such as relationships, non-tree links, lexical classes, semantic classes, etc. These entities—words and phrases can be found through their grammatical features, lexical properties, syntactic and/or semantic properties. Clauses (sentences) can be found through any lexical, syntactic or semantic features.

Using the described methods, a type of search can be implemented. For example, a search can be made for properties of syntactic or semantic structural nodes—grammatical meanings, by the superclass (the class with all descendants) by semantemes (e.g., "time" without regard to the form of expression). Another search variant consists of a search of relationships between properties. For example, a search can be made for surface or deep slots with validation (or no validation) of inheritance, anaphoric links, or any number of nodes with the specified properties. Additionally, it is possible to derive the meanings of these attributes in the retrieved results.

Of significance is that since a search query can be translated into a semantic form that is independent of the actual language, the search can be carried out in texts in different languages, and in resources, including corpora of different languages. Thus, the user can retrieve information provided in all resources, regardless of the query language. The search result can be presented to the user in the language of the resource (as it appears in the original), or a search result can be translated into the language of the query using a machine translation system.

In some implementations, not only one or more indices can be used for the search, but also formal models positing knowledge about one or more domains. For example, ontologies can be used as domain models. An ontology may include, among other things, the set of concepts and entities related to the subject area and the relationships between them. They are used for domain modeling and logical deduction.

Figure 14:
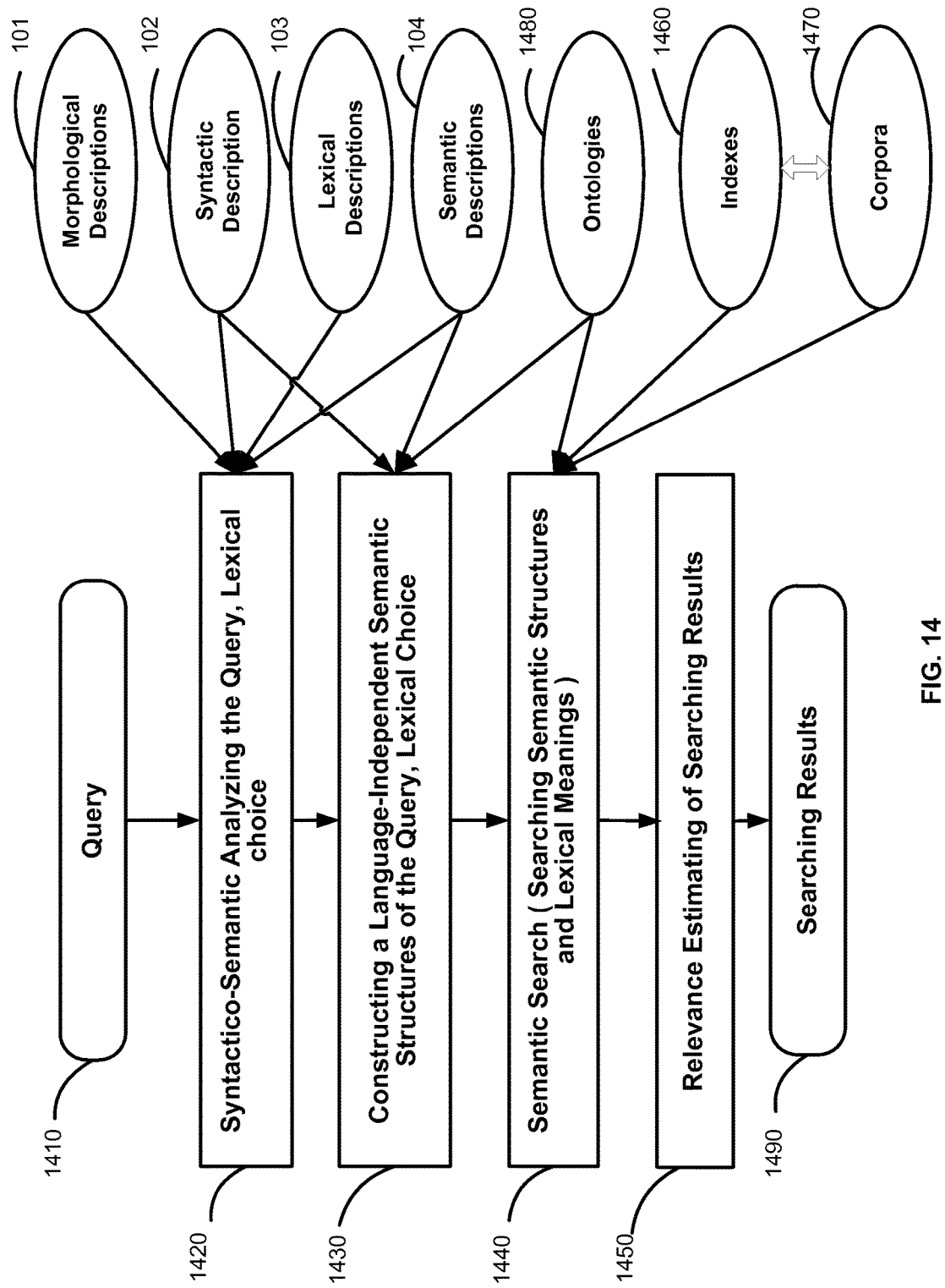
FIG. 14 illustrates a flow diagram of a process for performing a semantic search.

FIG. 14 illustrates a flow diagram of a process for performing semantic search in the text corpus which underwent comprehensive semantic and syntactic parsing. A search query (1410) is subjected to an exhaustive semantic-syntactic analysis (1420), similar to that done for each sentence of the text corpus in accordance with steps 106 and 107 of the method represented in FIG. 1. Thus, semantic and syntactic parsing of the query includes a lexical analysis (101) using morphological and lexical (103) descriptions, then conducts a parsing of syntax (102) using syntactic and semantic (104) descriptions, during which process, in particular, all potentially possible lexical meanings of words are generated forming a sentence or phrase and all potentially possible relationships between them. As a result, the most probable or likely syntactic structure is selected, and the lexical meanings and corresponding and semantic classes of all elements of the sentence are determined.

A semantic structure of the query is constructed (1430), which, along with the syntactic structure of the sentence, can be used for formal conclusions from data stored in ontologies (1480). For example, in response to the question "Who won at the Rome Olympics in fencing?" a result of the search, in particular, may be the sentence "Petrov became the Olympic champion in fencing in 1960." The unification of semantic structures is produced by transformational rules, rules for ontologies, and mapping of ontological data about the fact that "Rome hosted the Olympics in 1960," "in 1960 the Olympics were held in Rome," "Roman Olympics"="the Olympic Games in Rome," "win the Olympics"="to become an Olympic champion." And also "the Olympic Games in Rome"="the Summer Olympic Games of 1960."

The ontology may include descriptions of, for example, entities, classes (concepts, understandings), attributes, relationships, and ontological facts. For example, entities or objects are instances of classes that represent the basic level of concepts (objects). Also, the classes may represent a set, collection, concepts, classes in programming, object types, forms (varieties) of things, etc. Examples of classes may be Person (persons), Geographical Object (geographic objects), Company (companies), Organization (organizations), Numerical Value (numerical values), etc.

Attributes express aspects, properties, features, characteristics or parameters that can have objects or classes. The relationship is a means of expressing the relationships that entities and classes have to each other and between themselves. Some of the events may cause changes in attributes or relationships. Ontologies are encoded using special languages of ontologies.

These ontological objects—entities, classes (concepts), attributes, relationships, ontological facts, may be included in the search query. Different approaches can be used to specify the words including in a query as ontological objects. For example, the query "Dakota" can designate a location, a person, or an organization, etc. In one embodiment, such objects can be clearly marked, for example "Dakota % person". In another embodiment, if the option "Search the ontology" is included, the user can see a selection on a menu displaying choices of the type of ontological object, as indicated, for example, in FIG. 14. In yet another embodiment, the type of ontological object can be automatically defined. For example, it can be defined on the basis of a parsing of the query, a pragmatic or contextual parsing of previous queries, of corpus topics selected for the search, user information, etc. For example, for the query "(apple OR HTC) AND NOT litigation", the system can analyze the subject matter of words in the query, and conclude that, in all probability, for "apple," the appropriate lexical meaning to select is in the semantic class APPLE_COMPUTER_FIRM, rather than in the class "FRUIT" or "FRUIT_TREE", and if the option "Search in ontology" is activated, the system will automatically select the type of object—the Company, and the user can see the information from the ontology relevant to the company Apple. In case of ambiguity, the user can specify one or two questions to clarify the type of object.

Taking into account the variations of semantic and syntactic structures and data received from ontologies (1480), the system can generate a comprehensive or exhaustive semantic request for indices (1460) of the corresponding text corpus (1470). Since the meaning (semantics) of the original question is fixed, during the search process (1440) the system seeks lexical meanings and semantic structures of sentences containing responses to the question, taking into account possible alternatives to formulating the question and the various syntactic and lexical variants of the answer. Also, the search is performed with reference to anaphoric and other referential links between sentences imposed in the construction of the semantic structures of the sentences parsed in step 107 (FIG. 1A), so that the system finds text fragments where the search object is expressed implicitly, using references, such as personal, demonstrative, relative pronouns, referential noun phrases, zero groups, substitutions, etc.

Each retrieved text block can be formally assessed (1450) according to the degree of relevance to the query. In particular, in one implementation, the relevancy assessment (1450) takes into account the indexing of lexical meanings with probability in the construction of the index (109), as described in the illustration of the stage (108) depicted in FIG. 1. Thus, the search results (1490) can be ranked by relevancy and shown to the user in proper order.

Figure 15:
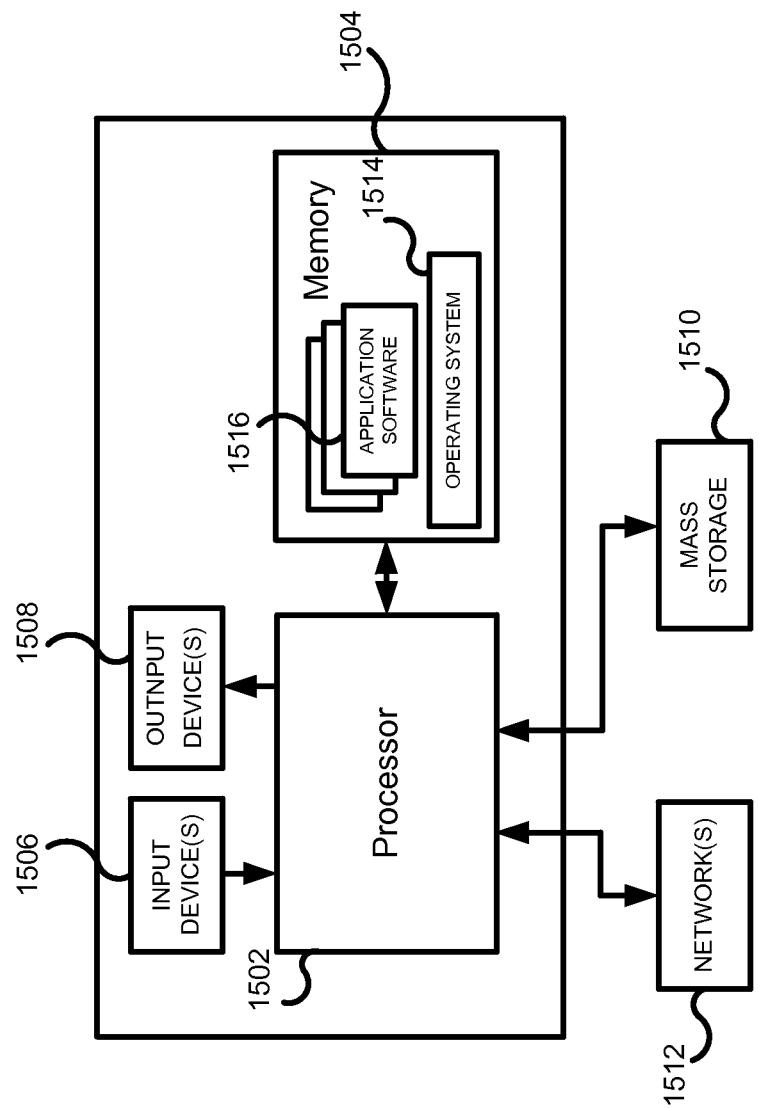
FIG. 15 illustrates exemplary hardware for implementing the searching system.

FIG. 15 shows an exemplary computer platform (1500) for implementing the techniques and systems described herein. The computer platform (1500) includes at least one processor (1502) connected to a memory (1504). The processor (1502) may be one or more processors and may contain one, two, or more computer cores. The memory (1504) may be random access memory RAM and may also contain any other types or kinds of memory, particularly non-volatile memory devices (such as flash drives) or read-only memory devices such as hard drives, etc. In addition, an arrangement can be considered in which the memory (1504) includes storage media built into the equipment for information physically located somewhere else, as well on the computer platform (1500) such as a cache in the processor (1502), and memory used as a virtual device and stored on external or internal ROM (1510).

The computer platform (1500) may also include a number of input and output ports to transfer information out and to receive information. For interaction with a user, the computer platform (1500) may contain one or more input devices (such as a keyboard, a mouse, a scanner, and so forth) and a display device (1508) (such as a liquid crystal display). The computer platform (1500) may also have one or more read-only memory devices (1510) such as an optical disk drive (CD, DVD or other), a hard disk, or a tape drive. In addition, the computer platform (1500) may have an interface with one or more networks (1512) that provide connections with other networks and computer equipment. In particular, this may be a local area network (LAN), a wireless Wi-Fi network and may or may not be connected to the World Wide Web (Internet). It is understood that the computer facilities (1500) include appropriate analog and/or digital interfaces between the processor (1502) and each of the components (1504, 1506, 1508, 1510 and 1512).

The computer facilities (1500) are managed by the operating system (1514) and include various applications, components, programs, objects, modules and other, designated by the consolidated number 1516.

The programs used to implement the disclosed methods may be a part of an operating system or may be a specialized application, component, program, dynamic library, module, script, or a combination thereof. The disclosed methods and systems cannot be limited by the hardware mentioned earlier.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be changed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computer-implemented method for performing a semantic search in a natural language text, the method comprising:

performing, by a processor, a syntactico-semantic analysis of a natural language text to produce a plurality of semantic structures representing a plurality of sentences of the natural language text, wherein the syntactico-semantic analysis of a sentence of the natural language text comprises:
generating a plurality of relationships between lexical units of the sentence,
producing a graph of generalized constituents of the sentence,
generating a plurality of syntactic trees based on the graph of generalized constituents,
selecting an optimal syntactic tree in view of determined non-tree links,
producing a semantic structure based on the selected syntactic tree, and
storing the semantic structure in a memory;
producing, using the plurality of semantic structures, an index indicative of positions, within the natural language text, of certain values of at least one of morphological parameters, syntactic parameters, lexical parameters, or semantic parameters, and wherein the index further comprises weight values associated with the parameter values;

searching, using the index, the natural language text for text fragments satisfying a search query;

estimating relevance of search results based on weight values specified by the index; and ranking search results according to estimated relevance.

2. The method of claim 1, wherein the syntactico-semantic analysis further comprises performing a lexical selection for each lexical unit.

3. The method of claim 2, wherein performing the lexical selection for each lexical unit further comprises selecting a most probable lexical meaning of the lexical unit from a plurality of lexical meanings using a priori ratings and integral calculated ratings.

4. The method of claim 2, wherein performing the lexical selection for each lexical unit further comprises assigning to the lexical unit a set of possible lexical meanings, each of lexical meaning having a corresponding probability of occurrence in the sentence.

5. The method of claim 1, wherein performing the syntactico-semantic analysis further comprises identifying values of at least one of: morphological, lexical, syntactical or semantic parameters of the natural language text.

6. The method of claim 1, wherein performing the syntactico-semantic analysis further comprises associating a concept of an ontology with at least part of the sentence.

7. The method of claim 1, wherein performing the syntactico-semantic analysis further comprises restoring referential links between sentences.

8. The method of claim 1, wherein at least one lexical unit of the query comprises a lexical meaning.

9. The method of claim 8, wherein the query query comprises a combination of lexical meanings using at least one Boolean operator.

10. The method of claim 8, wherein the lexical meaning represents a user selection of a semantic class from a list of semantic classes.

11. The method of claim 8, wherein the lexical meaning represents a user selection of an interpretation from a list of interpretations of the lexical unit.

12. The method of claim 8, wherein the lexical meaning is determined using probability estimates.

13. The method of claim 8, wherein the lexical meaning is determined using pragmatic and context analysis.

14. The method of claim 8, wherein the lexical meaning is determined based on syntactico-semantic analysis of the query.

15. The method of claim 1, wherein an element of the query comprises a syntactic structure.

16. The method of claim 1, wherein an element of the query comprises a semantic structure.

17. The method of claim 1, wherein the query comprises a sentence in a natural language.

18. The method of claim 1, wherein the query comprises an interrogative sentence in a natural language.

19. The method of claim 1, wherein the query comprises a sentence in a natural language having a lacuna.

20. The method of claim 1, further comprising assigning a concept of ontology to at least one unit of the query.

21. The method of claim 1, wherein searching is performed using restored referential links between sentences of the natural language text.

22. The method of claim 1, wherein searching further comprises identifying, in the natural language text, lexical meanings similar to a lexical meaning referenced by the query.

23. The method of claim 1, wherein searching comprises identifying, in the natural language text, syntactic structures that are similar to syntactic structures of the query.

24. The method of claim 1, wherein searching comprises identifying, in the natural language text, semantic structures that are similar to semantic structures of the query.

25. The method of claim 1, wherein estimating relevance of a search result is performed using a measure of relevance based on proximity of an identified lexical meaning to a corresponding item in the query.

26. The method of claim 1, wherein estimating relevance of a search result is performed using a probability estimate of an identified lexical meaning in a fragment of the natural language text.

27. The method of claim 1, wherein the search results include information about lexical meanings of the elements of the query in identified fragments of the natural language text.

28. A system for performing a semantic search in a natural language text, the system comprising one or more processors coupled to a memory, the processors configured to:

perform a syntactico-semantic analysis of a natural language text to produce a plurality of semantic structures representing a plurality of sentences of the natural language text, wherein the syntactico-semantic analysis of a sentence of the natural language text comprises:
generating a plurality of relationships between lexical units of the sentence,
producing a graph of generalized constituents of the sentence,
generating a plurality of syntactic trees based on the graph of generalized constituents,
selecting an optimal syntactic tree in view of determined non-tree links,
producing a semantic structure based on the selected syntactic tree, and
storing the semantic structure in the memory;

produce, using the plurality of semantic structures, an index indicative of positions, within the natural language text, of certain values of at least one of morphological parameters, syntactic parameters, lexical parameters, or semantic parameters, and wherein the index further comprises weight values associated with the parameter values;

search, using the index, the natural language text for text fragments satisfying a search query;

estimate relevance of search results based on weight values specified by the index; and rank search results according to estimated relevance.

29. The system of claim 28, wherein the syntactico-semantic analysis further comprises performing a lexical selection for each lexical unit.

30. A non-transitory computer-readable storage medium having machine instructions stored therein, that when executed by a processor, cause the processor to:

performing a syntactico-semantic analysis of a natural language text to produce a plurality of semantic structures representing a plurality of sentences of the natural language text, wherein the syntactico-semantic analysis of a sentence of the natural language text comprises:
generating a plurality of relationships between lexical units of the sentence, producing a graph of generalized constituents of the sentence, generating a plurality of syntactic trees based on the graph of generalized constituents, selecting an optimal syntactic tree in view of determined non-tree links, producing a semantic structure based on the selected syntactic tree, and storing the semantic structure in the memory;

producing, using the plurality of semantic structures, an index indicative of positions, within the natural language text, of certain values of at least one of morphological parameters, syntactic parameters, lexical parameters, or semantic parameters, and wherein the index further comprises weight values associated with the parameter values;

searching, using the index, the natural language text for text fragments satisfying a search query;

estimating relevance of search results based on weight values specified by the index; and ranking search results according to estimated relevance.

* * * * *